US012693167B2

(12) United States Patent
Lius

(10) Patent No.: US 12,693,167 B2
(45) Date of Patent: Jul. 28, 2026

(54) FLEXIBLE SENSOR

(71) Applicant: InnoLux Corporation, Miao-Li County (TW)

(72) Inventor: Chandra Lius, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 308 days.

(21) Appl. No.: 18/409,751

(22) Filed: Jan. 10, 2024

(65) Prior Publication Data

US 2024/0272005 A1 Aug. 15, 2024

Related U.S. Application Data

(60) Provisional application No. 63/485,211, filed on Feb. 15, 2023.

(30) Foreign Application Priority Data

Sep. 19, 2023 (CN) .......................... 202311206388.6

(51) Int. Cl.
*G01J 5/10* (2006.01)
(52) U.S. Cl.
CPC ...................................... *G01J 5/10* (2013.01)
(58) Field of Classification Search
CPC .......... G01J 5/10; G01J 1/0403; G01J 5/0205;
G01J 1/0271; G01J 2005/202; G01J
2005/206; G01J 5/0225; G01J 5/045
See application file for complete search history.

(56) References Cited

U.S. PATENT DOCUMENTS

| | | | | |
|---|---|---|---|---|
| 9,933,886 B2 * | 4/2018 | Kim | ........................ | B65H 5/025 |
| 2002/0068389 A1 * | 6/2002 | Green | ................. | H05K 1/0278 |
| | | | | 438/149 |
| 2012/0165759 A1 * | 6/2012 | Rogers | ................. | H05K 1/0283 |
| | | | | 606/228 |
| 2016/0283025 A1 * | 9/2016 | Yang | ..................... | G06F 3/0412 |
| 2019/0107911 A1 * | 4/2019 | Zhai | ..................... | G06F 3/0443 |
| 2021/0368627 A1 * | 11/2021 | Smits | ................... | H05K 1/0393 |
| 2022/0100302 A1 * | 3/2022 | Li | ......................... | G06F 3/0446 |
| 2023/0051536 A1 * | 2/2023 | Tian | ..................... | H10K 77/111 |

* cited by examiner

Primary Examiner — John E Breene
Assistant Examiner — Janice M Soto
(74) Attorney, Agent, or Firm — Winston Hsu

(57) ABSTRACT

A flexible sensor capable of being stretched from a first state to a second state is provided by the present disclosure. The flexible sensor includes a stretchable substrate and a plurality of sensing elements. The stretchable substrate has a plurality of island portions and a plurality of bridge portions, wherein at least one of the bridge portions connects adjacent two of the island portions. The sensing elements are disposed on the island portions of the stretchable substrate. The at least one of the bridge portions has a first length in the first state and has a second length in the second state, and the first length is different from the second length.

18 Claims, 21 Drawing Sheets

FLEXIBLE SENSOR

CROSS REFERENCE TO RELATED APPLICATION

This application claims the benefit of U.S. Provisional Application No. 63/485,211, filed on Feb. 15, 2023. The content of the application is incorporated herein by reference.

BACKGROUND OF THE DISCLOSURE

1. Field of the Disclosure

The present disclosure relates to a flexible sensor, and more particularly to a flexible sensor having a substrate with pattern design.

2. Description of the Prior Art

Sensors such as infrared thermal sensors or light sensors can serve as biosensors. However, current sensors have poor flexibility, which limits the application of the sensors. Therefore, to improve the flexibility of sensors is still an important issue in the present field.

SUMMARY OF THE DISCLOSURE

The present disclosure aims at providing a flexible sensor.

A flexible sensor capable of being stretched from a first state to a second state is provided by the present disclosure. The flexible sensor includes a stretchable substrate and a plurality of sensing elements. The stretchable substrate has a plurality of island portions and a plurality of bridge portions, wherein at least one of the bridge portions connects adjacent two of the island portions. The sensing elements are disposed on the island portions of the stretchable substrate. The at least one of the bridge portions has a first length in the first state and has a second length in the second state, and the first length is different from the second length.

These and other objectives of the present disclosure will no doubt become obvious to those of ordinary skill in the art after reading the following detailed description of the embodiment that is illustrated in the various figures and drawings.

DETAILED DESCRIPTION

Figure 1:
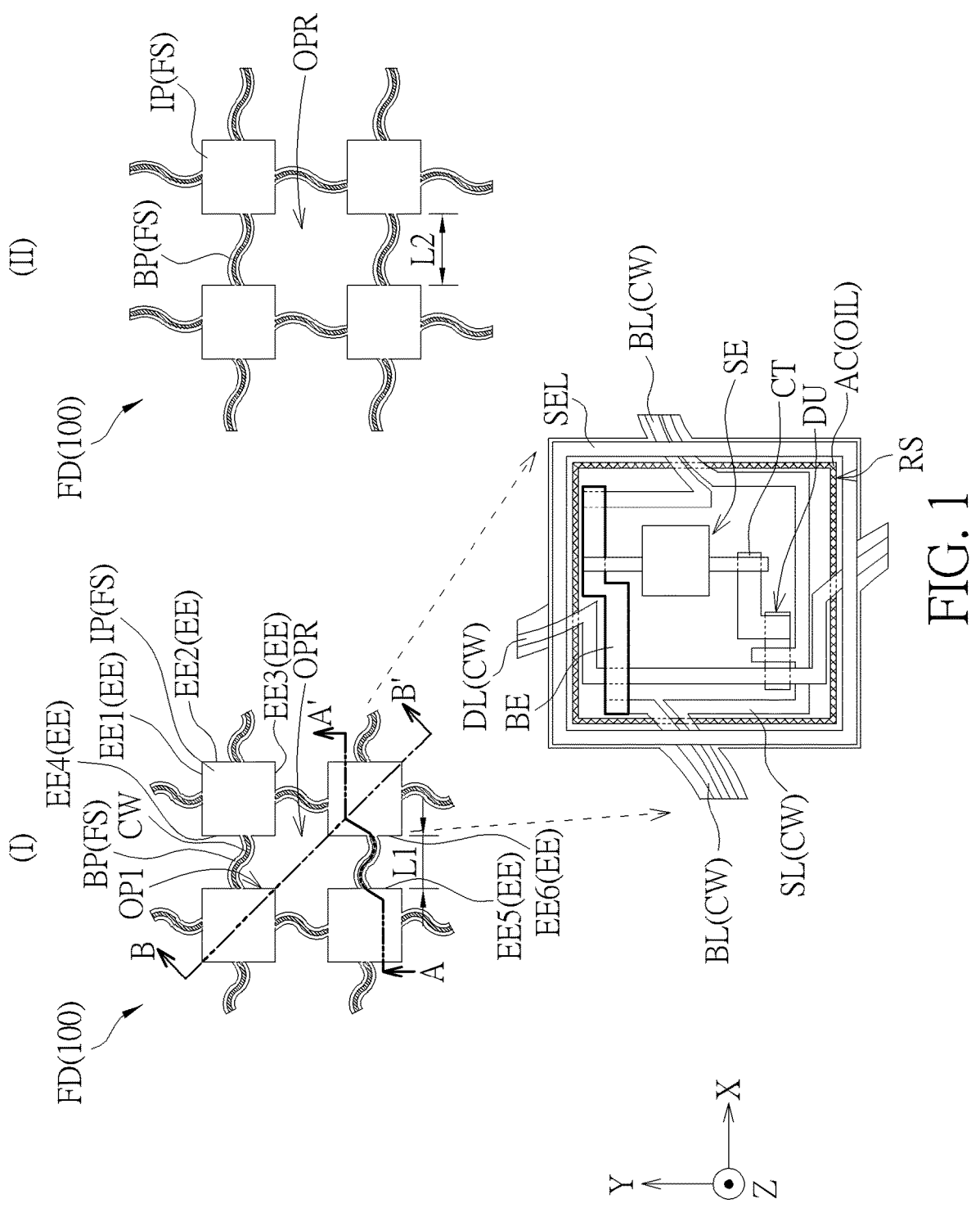
FIG. 1 schematically illustrates a top view of an electronic device according to a first embodiment of the present disclosure.

The present disclosure may be understood by reference to the following detailed description, taken in conjunction with the drawings as described below. It is noted that, for purposes of illustrative clarity and being easily understood by the readers, various drawings of this disclosure show a portion of the device, and certain elements in various drawings may not be drawn to scale. In addition, the number and dimension of each element shown in drawings are only illustrative and are not intended to limit the scope of the present disclosure.

Certain terms are used throughout the description and following claims to refer to particular elements. As one skilled in the art will understand, electronic equipment manufacturers may refer to an element by different names. This document does not intend to distinguish between elements that differ in name but not function.

In the following description and in the claims, the terms "include", "comprise" and "have" are used in an open-ended fashion, and thus should be interpreted to mean "include, but not limited to . . . ".

It will be understood that when an element or layer is referred to as being "disposed on" or "connected to" another element or layer, it can be directly on or directly connected to the other element or layer, or intervening elements or layers may be presented (indirectly). In contrast, when an element is referred to as being "directly on" or "directly connected to" another element or layer, there are no intervening elements or layers presented. When an element or a layer is referred to as being "electrically connected" to another element or layer, it can be a direct electrical connection or an indirect electrical connection. The electrical connection or coupling described in the present disclosure may refer to a direct connection or an indirect connection. In the case of a direct connection, the ends of the elements on two circuits are directly connected or connected to each other by a conductor segment. In the case of an indirect connection, switches, diodes, capacitors, inductors, resistors, other suitable elements or combinations of the above elements may be included between the ends of the elements on two circuits, but not limited thereto.

Although terms such as first, second, third, etc., may be used to describe diverse constituent elements, such constituent elements are not limited by the terms. The terms are used only to discriminate a constituent element from other constituent elements in the specification. The claims may not use the same terms, but instead may use the terms first, second, third, etc. with respect to the order in which an element is claimed. Accordingly, in the following description, a first constituent element may be a second constituent element in a claim.

According to the present disclosure, the thickness, length and width may be measured through optical microscope, and the thickness or width may be measured through the cross-sectional view in the electron microscope, but not limited thereto.

In addition, any two values or directions used for comparison may have certain errors. In addition, the terms "equal to", "equal", "the same", "approximately" or "substantially" are generally interpreted as being within ±20%, ±10%, ±5%, ±3%, ±2%, ±1%, or ±0.5% of the given value.

In addition, the terms "the given range is from a first value to a second value" or "the given range is located between a first value and a second value" represents that the given range includes the first value, the second value and other values there between.

If a first direction is said to be perpendicular to a second direction, the included angle between the first direction and the second direction may be located between 80 to 100 degrees. If a first direction is said to be parallel to a second direction, the included angle between the first direction and the second direction may be located between 0 to 10 degrees.

Unless it is additionally defined, all terms (including technical and scientific terms) used herein have the same meaning as commonly understood by those ordinary skilled in the art. It can be understood that these terms that are defined in commonly used dictionaries should be interpreted as having meanings consistent with the relevant art and the background or content of the present disclosure, and should not be interpreted in an idealized or overly formal manner, unless it is specifically defined in the embodiments of the present disclosure.

It should be noted that the technical features in different embodiments described in the following can be replaced, recombined, or mixed with one another to constitute another embodiment without departing from the spirit of the present disclosure.

The electronic device of the present disclosure may include a sensing device, such as a thermal sensor. The electronic device may be a foldable electronic device, a flexible electronic device or a stretchable electronic device. For example, the electronic device of the present disclosure may include a flexible sensor.

The electronic device of the present disclosure may be applied to display devices, backlight devices, antenna devices, tiled devices or other suitable electronic devices, but not limited thereto. The display devices may for example include laptops, common displays, tiled displays, vehicle displays, touch displays, televisions, monitors, smart phones, tablets, light source modules, lighting devices or electronic devices applied to the products mentioned above, but not limited thereto. The antenna devices may for example include liquid crystal antenna devices or other suitable antenna devices. The tiled devices may for example include tiled display devices or tiled antenna devices, but not limited thereto. The outline of the electronic device may be a rectangle, a circle, a polygon, a shape with curved edge or other suitable shapes. The electronic device may include electronic units, wherein the electronic units may include passive elements or active elements, such as capacitor, resistor, inductor, diode, transistor, sensors, integrated circuits, and the like. The diode may include a light emitting diode, a photo diode or a varactor diode. The light emitting diode may for example include an organic light emitting diode (OLED) or an in-organic light emitting diode. The in-organic light emitting diode may for example include a mini light emitting diode (mini LED), a micro light emitting diode (micro LED) or a quantum dot light emitting diode (QLED), but not limited thereto. It should be noted that the electronic device of the present disclosure may be combinations of the above-mentioned devices, but not limited thereto.

Figure 2:
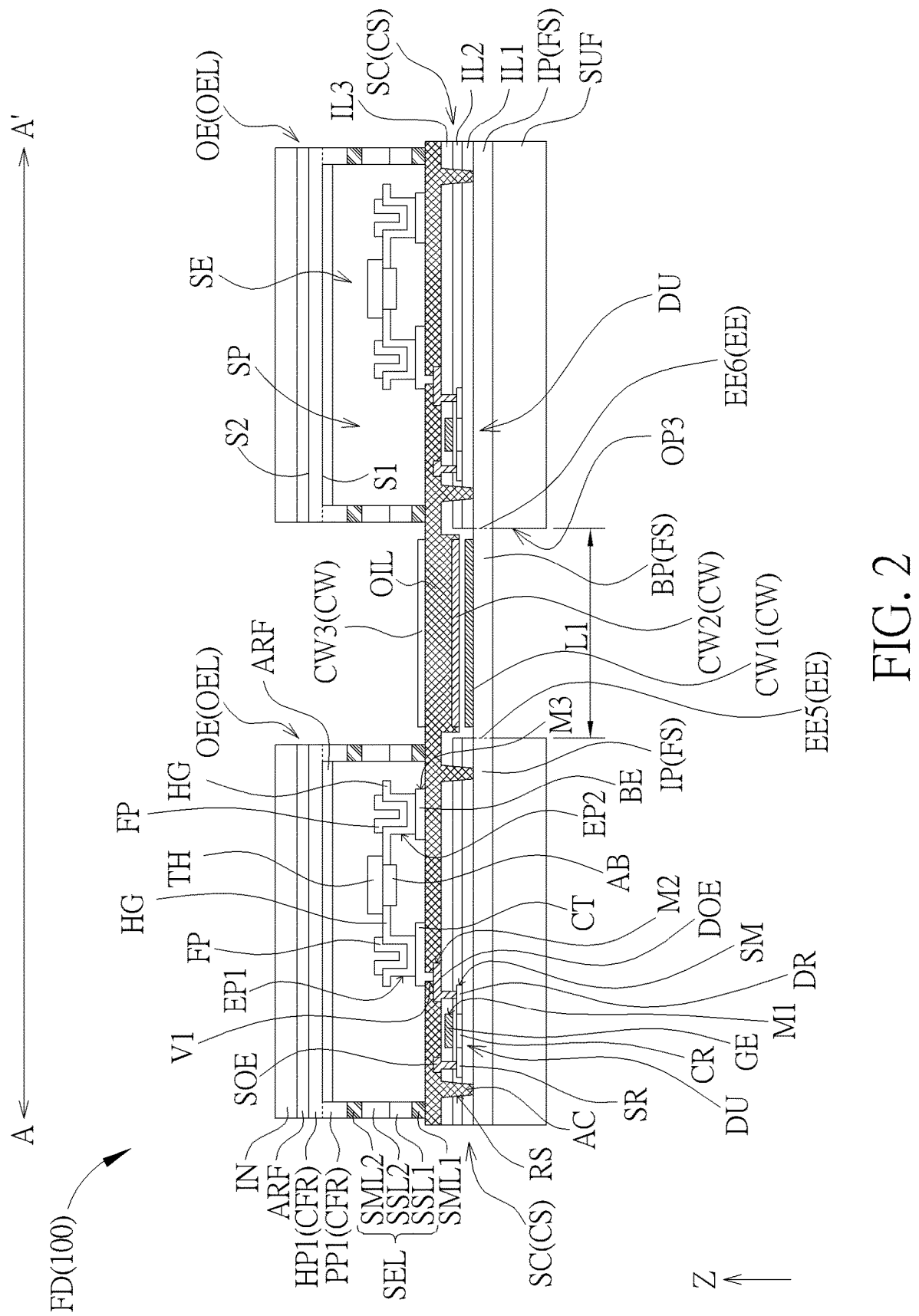
FIG. 2 schematically illustrates a cross-sectional view of the electronic device according to the first embodiment of the present disclosure along a section line A-A'.
Figure 3:
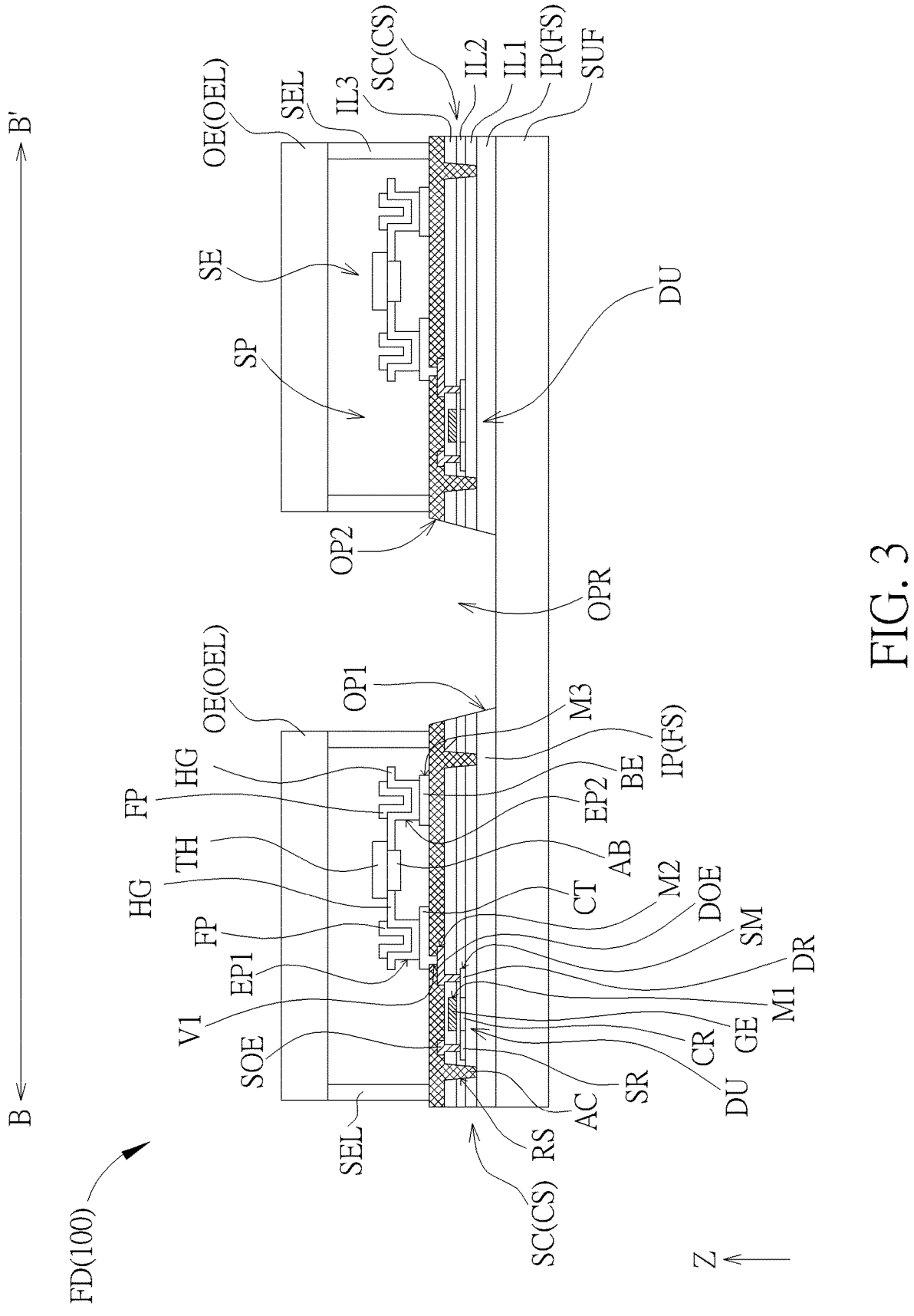
FIG. 3 schematically illustrates a cross-sectional view of the electronic device according to the first embodiment of the present disclosure along a section line B-B'.

Referring to FIG. 1 to FIG. 3, FIG. 1 schematically illustrates a top view of an electronic device according to a first embodiment of the present disclosure, FIG. 2 schematically illustrates a cross-sectional view of the electronic device according to the first embodiment of the present disclosure along a section line A-A', and FIG. 3 schematically illustrates a cross-sectional view of the electronic device according to the first embodiment of the present disclosure along a section line B-B'. According to the present embodiment, the electronic device 100 may include a stretchable substrate FS, a circuit structure CS disposed on the stretchable substrate FS and a plurality of sensing elements SE disposed on the stretchable substrate FS, but not limited thereto. In the present embodiment, the electronic device 100 may include a flexible sensor FD. In such condition, the sensing elements SE may include any suitable thermal sensing element or light sensing element, and the circuit structure CS may include any suitable electronic element for driving thermal sensing element or light sensing element. In some embodiments, the sensing elements SE may include sensors of other types. The flexible sensor FD including a temperature sensor (or a thermal sensor) is taken as an example to describe the structures of the elements and the layers of the flexible sensor FD in the following.

The stretchable substrate FS may include a flexible substrate or partially be a flexible substrate. The material of the stretchable substrate FS may include polyimide (PI), polycarbonate (PC), polyethylene terephthalate (PET), other suitable materials, or combinations of the above-mentioned materials. It should be noted that although the stretchable substrate FS is shown as a single layer in FIG. 2, the present embodiment is not limited thereto. In some embodiments, the stretchable substrate FS may include a multi-layer structure.

The stretchable substrate FS may be a patterned substrate and include a plurality of island portions IP and a plurality of bridge portions BP, wherein at least one of the bridge portions BP may connect adjacent two of the island portions IP. Specifically, as shown in FIG. 1, each of the island portions IP of the stretchable substrate FS may be connected to at least one bridge portion BP, and thereby being connected to another island portion IP through the bridge portion BP to which it is connected. As shown in FIG. 1, the island portion IP may have a rectangular shape, and the bridge portion BP may have a strip shape, but not limited thereto. In some embodiments, the island portion IP may have a circular shape or other suitable shapes. In some embodiments, the bridge portion BP may include any suitable non-strip shape having curved edge or non-sharp edge. The island portion IP is configured to dispose the sensing element(s) SE thereon. In the present embodiment, the plurality of sensing elements SE are disposed on the plurality of island portions IP. In other words, the sensing elements SE may be disposed corresponding to the island portions IP or disposed on the island portions IP. "The sensing elements SE are disposed corresponding to the island portions IP" described herein may represent that the sensing elements SE overlap or at least partially overlap the island portions IP in a top view direction (that is, the direction Z, which will not be redundantly described in the following) of the flexible sensor FD. For example, the sensing elements SE may overlap the island portions IP in the top view direction of the flexible sensor FD in the present embodiment. The definition of "corresponding" mentioned in the following may refer to the contents mentioned above, and will not be redundantly described. In the present embodiment, as shown in FIG. 1 and FIG. 2, each of the sensing elements SE may be disposed corresponding to one of the island portions IP, but not limited thereto. In other words, one of the sensing elements SE may be disposed on one of the island portions IP. The bridge portion BP may be configured to change the distance between the adjacent island portions IP to which it is connected. For example, when the flexible sensor FD is deformed (such as being stretched), the bridge portions BP may be deformed, and the sizes (such as length) of the bridge portions BP may be changed due to deformation, thereby changing the distance between the island portions IP, but not limited thereto. In another aspect, the bridge portions BP with different sizes may be designed through different pattern designs, thereby changing the distances between the adjacent island portions IP. In other words, the island portions IP may provide support to the sensing elements SE disposed thereon, and the bridge portions BP may provide stretching effect of the stretchable substrate FS.

In the present embodiment, in a top view of the flexible sensor FD, the island portion IP of the stretchable substrate FS may be defined through the points where the pattern of the stretchable substrate FS has a rapid change in width, but not limited thereto. Specifically, in the top view (as shown in FIG. 1) of the flexible sensor FD, the stretchable substrate FS may have a rapid change in width at the edges EE of the island portions IP, and the regions of the island portions IP may be defined as the regions enclosed by the edges EE. For example, as shown in FIG. 1, the stretchable substrate FS may have a rapid decrease in width at the edge EE1, the edge EE2, the edge EE3 and the edge EE4 of an island portion IP, and the region of the island portion IP may be defined as the region enclosed by the edge EE1, the edge EE2, the edge EE3 and the edge EE4 (that is, the region where the width does not decrease is defined as the region of the island portion IP), but not limited thereto. In other embodiments, the region of the island portion IP may be defined through other suitable ways. After the regions of the island portions IP are defined, the other portions of the stretchable substrate FS other than the island portions IP may be defined as the bridge portions BP. Specifically, the portion of the stretchable substrate FS located between two adjacent island portions IP may be defined as a bridge portion BP. Or, two ends of a bridge portion BP may respectively correspond to the edges EE of two adjacent island portions IP. For example, as shown in FIG. 1 and FIG. 2, a bridge portion BP may be defined as a portion of the stretchable substrate FS between the edge EE5 and the edge EE6, but not limited thereto.

The flexible sensor FD may be deformed by stretching the stretchable substrate FS. In such condition, the flexible sensor FD may be stretched to be attached to any suitable surface, such as a curved surface. Therefore, the application of the flexible sensor FD may be increased. Specifically, in the present embodiment, the flexible sensor FD may be stretched from a first state to a second state. The first state may refer to a state when the flexible sensor FD is not stretched, which is shown as the first state I in FIG. 1. The second state may refer to the state after the flexible sensor FD is stretched in any way, which is shown as the second state II in FIG. 1. In other words, in the first state I, the stretchable substrate FS of the flexible sensor FD may not be stretched by external force; and in the second state II, the stretchable substrate FS of the flexible sensor FD may be stretched by external force and deformed. As mentioned above, since the stretchable substrate FS may be deformed through the deformation of the bridge portions BP, the length of the bridge portions BP may be changed by stretching the stretchable substrate FS. In such condition, the length of a bridge portion BP in the first state I and the length of the bridge portion BP in the second state II may be different. For example, as shown in FIG. 1, one of the bridge portions BP may have a first length L1 in the first state I, and the one of the bridge portions BP may have a second length L2 in the second state II, wherein the first length L1 is different from the second length L2. In some embodiments, the second length L2 may be greater than the first length L1. In the present embodiment, the length of the bridge portion BP may for example be defined through the following way, but the present disclosure is not limited thereto. In an embodiment, in the top view of the flexible sensor FD, the length of a bridge portion BP may be defined as the distance between the edges EE to which the two ends of the bridge portion BP correspond. For example, the first length L1 of the bridge portion BP shown in FIG. 1 may be defined as the distance between the edge EE5 and the edge EE6. In some embodiments, in a cross-sectional view (as shown in FIG. 2) of the flexible sensor FD, a bridge portion BP may be defined between the edges EE (such as the edge EE5 and the edge EE6) of adjacent two island portions IP, and the length (such as the first length L1 or the second length L2) of the bridge portion BP may be defined as the length of the bottom of the bridge portion BP or the length of a side of the bridge portion BP adjacent to the supporting film SUF. In an embodiment, the flexible sensor FD may further include a supporting film SUF, wherein the portion of the supporting film SUF corresponding to the bridge portion BP may be removed to form sections, as shown in FIG. 2. In such condition, in the cross-sectional view of the flexible sensor FD, the length of the bridge portion BP may also be defined as the distance between the sections of the supporting film SUF. In other embodiments, the length of the bridge portion BP may be defined through other suitable ways, and the present disclosure is not limited thereto.

It should be noted that the shape of the stretchable substrate FS shown in FIG. 1 is exemplary, and the present disclosure is not limited thereto.

According to the present embodiment, the flexible sensor FD may include at least one opening region OPR. Specifically, the regions of the flexible sensor FD corresponding to the island portions IP and the bridge portions BP may be defined at first, and other regions of the flexible sensor FD except the above-mentioned regions may be defined as the opening regions OPR, but not limited thereto. In another aspect, the region enclosed by the adjacent island portions IP and the bridge portions BP may also be defined as the opening region OPR. In the present embodiment, as shown in FIG. 1, the stretchable substrate FS may be patterned to form the plurality of island portions IP and the plurality of bridge portions BP, and a plurality of openings OP1 may be formed in the stretchable substrate FS during the patterning process of the stretchable substrate FS. Specifically, an entire material layer of the stretchable substrate FS may be disposed at first, and the portion of the material layer of the stretchable substrate FS corresponding to the opening regions OPR of the flexible sensor FD may be removed to form the openings OP1, thereby forming the stretchable substrate FS, but not limited thereto. In such condition, the openings OP1 may correspond to the opening regions OPR.

In the top view of the flexible sensor FD, the opening region OPR of the flexible sensor FD may be surrounded by multiple of the island portions IP and the bridge portions BP. For example, as shown in FIG. 1, the opening region OPR may be surrounded by four island portions IP and four bridge portions BP, or the range of the opening region OPR may be enclosed by four island portions IP and four bridge portions BP, but not limited thereto. In such condition, four island portions IP may be disposed at periphery of an opening region OPR, or the island portions IP may be disposed at surrounding sides of the opening region OPR. It should be noted that the positional relationship of the opening regions OPR and the island portions IP and the bridge portions BP mentioned above is exemplary, and the present disclosure is not limited thereto. In other embodiments, the stretchable substrate FS may have different shapes, and the numbers of the island portions IP and the bridge portions BP around the opening region OPR may be determined according to the shape of the stretchable substrate FS.

FIG. 2 and FIG. 3 show the cross-sectional views of the flexible sensor FD. Specifically, FIG. 2 shows the cross-sectional view of the flexible sensor FD along a section line (that is, the section line A-A') passing through the island portion IP and the bridge portion BP, and FIG. 3 shows the cross-sectional view of the flexible sensor FD along a section line (that is, the section line B-B') passing through the island portion IP and the opening region OPR. In detail, FIG. 2 shows a bridge portion BP and two adjacent island portions IP connected to each other through the bridge portion BP of the stretchable substrate FS. In addition, as shown in FIG. 3, since the portion of the stretchable substrate FS corresponding to the opening regions OPR may be removed in the present embodiment, the stretchable substrate FS may include openings corresponding to the opening regions OPR, that is, the openings OP1 mentioned above.

As shown in FIG. 2 (and FIG. 3), the circuit structure CS may be disposed on the stretchable substrate FS. In the present embodiment, the circuit structure CS may be disposed corresponding to the island portions IP of the stretchable substrate FS, or in other words, the circuit structure CS may be disposed on the island portions IP. Specifically, the circuit structure CS may include a plurality of sub circuit structures SC respectively be disposed on a surface of one of the island portions IP. In other words, a sub circuit structure SC may be disposed on the surface of an island portion IP. In the present embodiment, the circuit structure CS may form the plurality of sub circuit structures SC through a patterning process. The circuit structure CS may include various kinds of wires, circuits, active elements and/or passive elements that can be applied to the flexible sensor FD. For example, the circuit structure CS may include driving units DU, wherein the driving units DU may be electrically connected to any suitable electronic element in the flexible sensor FD. For example, the driving units DU may be electrically connected to the sensing elements SE to drive the sensing elements SE to which they are electrically connected, but not limited thereto. The driving unit DU may for example include thin film transistor(s) (TFT), but not limited thereto. Specifically, the circuit structure CS of the present embodiment may include a semiconductor layer SM, a conductive layer M1 and a conductive layer M2, wherein the semiconductor layer SM may form the channel region CR, the source region SR and the drain region DR of the driving unit DU, and the conductive layer M1 may form the gate electrode GE of the driving unit DU. The conductive layer M2 may be located on the conductive layer M1 and may for example form the source electrode SOE and the drain electrode DOE respectively be electrically connected to the source region SR and the drain region DR. The semiconductor layer SM may include semiconductor materials. The semiconductor materials may for example include silicon or metal oxides, such as low temperature polysilicon semiconductor (LTPS), amorphous silicon (a-Si) semiconductor, indium gallium zinc oxide (IGZO) semiconductor or combinations thereof, such as low temperature polysilicon oxide (LTPO), but not limited thereto. The conductive layer M1 and the conductive layer M2 may include any suitable conductive material, such as metals, but not limited thereto. As shown in FIG. 2, the circuit structure CS of the present embodiment may further include an insulating layer IL1 disposed on the stretchable substrate FS, an insulating layer IL2 located between the semiconductor layer SM and the conductive layer M1, and an insulating layer IL3 located between the conductive layer M1 and the conductive layer M2. The insulating layer IL1, the insulating layer IL2 and the insulating layer IL3 may include any suitable insulating material, such as organic insulating materials or inorganic insulating materials. In some embodiments, the insulating layer IL1 may serve as a buffer layer. The insulating layer IL2 may for example be the gate insulating layer in the driving unit DU. It should be noted that the structure of the circuit structure CS shown in FIG. 2 (and FIG. 3) is exemplary, and the present embodiment is not limited thereto.

Specifically, the continuous circuit structure CS may be formed on the stretchable substrate FS at first, and then a patterning process may be performed on the circuit structure CS to form the plurality of sub circuit structures SC respectively corresponding to the island portions IP. In the present embodiment, each of the sub circuit structures SC may include at least one driving unit DU, and the driving unit(s) DU in a sub circuit structure SC may be electrically connected to the sensing element(s) SE corresponding to the sub circuit structure SC. In detail, the driving unit(s) DU in a sub circuit structure SC may be electrically connected to the sensing element(s) SE disposed on the island portion where the sub circuit structure SC is located. For example, as shown in FIG. 2, in the present embodiment, a sensing element SE may be disposed on an island portion IP, and the sub circuit structure SC disposed on the surface of the island portion IP may include at least one driving unit DU (for example, one driving unit DU, but not limited thereto) electrically connected to the sensing element SE. In other embodiments, when multiple sensing elements SE are disposed on an island portion IP, the sub circuit structure SC disposed on the surface of the island portion IP may include a plurality of driving units DU respectively be electrically connected to the multiple sensing elements SE.

According to the present embodiment, as shown in FIG. 2 and FIG. 3, the circuit structure CS may not be disposed corresponding to the opening regions OPR and the bridge portions BP of the stretchable substrate FS. It should be noted that "the circuit structure CS is not disposed corresponding to the bridge portions BP and the opening regions OPR" described herein may include the condition that at least one of the insulating layers and the conductive layers of the circuit structure CS is not disposed corresponding to the bridge portions BP and the opening regions OPR. For example, as shown in FIG. 2 and FIG. 3, the driving unit DU or other active elements in the circuit structure CS may not be disposed corresponding to the bridge portions BP and the opening regions OPR. In addition, as shown in FIG. 2, the insulating layer (for example, the insulating layer IL1 and the insulating layer IL2) in the circuit structure CS may not be disposed corresponding to the bridge portions BP. Specifically, in the patterning process of the circuit structure CS of the present embodiment, the portion of the insulating layer IL1 in the circuit structure CS and the portion of the insulating layer IL2 in the circuit structure CS corresponding to the bridge portions BP may be removed, but not limited thereto. Moreover, as shown in FIG. 3, the conductive layers (including the conductive layer M1 and the conductive layer M2, but not limited thereto) and the insulating layers (including the insulating layer IL1, the insulating layer IL2 and the insulating layer IL3, but not limited thereto) in the circuit structure CS may not be disposed corresponding to the opening regions OPR, but not limited thereto. In some embodiments, some of the layers in the circuit structure CS may be disposed corresponding to the opening regions OPR. By making the circuit structure CS not disposed corresponding to the bridge portions BP and/or the opening regions OPR, the possibility that the circuit structure CS is damaged during deformation of the flexible sensor FD may be reduced, thereby improving the reliability of the flexible sensor FD.

According to the present embodiment, the flexible sensor FD may include at least one connecting wire CW, wherein the connecting wire CW may be electrically connected to the sensing elements SE respectively located on adjacent two island portions IP, such that electrical signals can be transmitted between the sensing elements SE located on different island portions IP. Specifically, the connecting wire CW may be disposed on at least one bridge portion BP of the stretchable substrate FS and extend on the at least one bridge portion BP. Since the bridge portion BP may connect two adjacent island portions IP, and the connecting wire CW may extend on the bridge portion BP, two ends of the connecting wire CW may respectively extend to the adjacent two island portions IP and be electrically connected to the sensing elements SE located on the adjacent two island portions IP. Specifically, two ends of the connecting wire CW may respectively be electrically connected to the driving units DU located on adjacent two island portions IP, and the driving units DU located on the adjacent two island portions IP may respectively be electrically connected to the sensing elements SE disposed on the adjacent two island portions IP. Therefore, the sensing elements SE on different island portions IP may be electrically connected to each other through the connecting wire CW. FIG. 1 exemplarily shows the condition that the connecting wires CW extend on the bridge portions BP, but the number and shape of the connecting wires CW are not limited to what is shown in FIG. 1.

In the present embodiment, the connecting wire CW may include a signal line electrically connected to the driving unit DU, other suitable wires in the flexible sensor FD, or combinations thereof, but not limited thereto. For example, as shown in FIG. 1, the connecting wires CW may include scan lines SL and/or data lines DL. In the present embodiment, a scan line SL may extend on a plurality of bridge portions BP and thereby extending through a plurality of island portions IP. The scan lines SL may substantially extend along a direction, such as the direction X, but not limited thereto. In such condition, a scan line SL may pass through a plurality of island portions IP arranged along the direction X. When a scan line pass through an island portion IP, it can be electrically connected to the driving unit(s) DU on the island portion IP, for example, the scan line can be electrically connected to the gate electrode(s) GE of the driving unit(s) DU. In other words, a scan line SL may be electrically connected to the gate electrodes GE of the driving units DU located on a plurality of island portions IP arranged along the direction X in the present embodiment, but not limited thereto. Similarly, in the present embodiment, a data line DL may extend on a plurality of bridge portions BP, thereby extending on and passing through a plurality of island portions IP. The data lines DL may substantially extend along a direction, such as the direction Y, but not limited thereto. In such condition, a data line DL may pass through a plurality of island portions IP arranged along the direction Y and be electrically connected to the driving units DU on the plurality of island portions IP, for example, the data line DL may be electrically connected to the source electrodes SOE of these driving units DU, but not limited thereto.

In some embodiments, the connecting wires CW may further include bias lines BL, wherein the bias lines BL may extend on the bridge portions BP and electrically connect the bias electrodes BE (the detail thereof will be described in the following) of the sensing elements SE on different island portions IP, but not limited thereto.

According to the present embodiment, as shown in FIG. 2, since the circuit structure CS may not be disposed corresponding to the bridge portions BP of the stretchable substrate FS, the connecting wire CW may directly be disposed on the bridge portion BP, that is, the connecting wire CW may directly contact the bridge portion BP.

In some embodiments, as shown in FIG. 2, a plurality of connecting wires CW may be disposed on a bridge portion BP, such as the connecting wire CW1 and the connecting wire CW2, wherein the plurality of connecting wires CW may be located in different layers or formed of different conductive layers. For example, the connecting wire CW1 may be in the same layer as the gate electrode GE, or the connecting wire CW1 may be formed of the conductive layer M1; and the connecting wire CW2 may be in the same layer as the source electrode SOE and/or the drain electrode DOE, or the connecting wire CW2 may be formed of the conductive layer M2, but not limited thereto. The connecting wire CW1 and the gate electrode GE may be formed in the same process, and the connecting wire CW2 and the source electrode SOE and/or the drain electrode DOE may be formed in the same process, but not limited thereto. The connecting wire CW1 may for example be the scan line SL above, and the connecting wire CW2 may for example be the data line DL above, but not limited thereto. In such condition, the connecting wire CW1 may directly be disposed on the bridge portion BP, that is, the connecting wire CW1 directly contacts the bridge portion BP of the stretchable substrate FS. The connecting wire CW2 is disposed on the connecting wire CW1. In addition, at least one insulating layer may be disposed between the connecting wire CW1 and the connecting wire CW2, such as the insulating layer IL3 mentioned above, but not limited thereto. The insulating layer IL3 may separate the connecting wire CW1 and the connecting wire CW2. Specifically, the insulating layer IL3 disposed between the conductive layer M1 and the conductive layer M2 in the circuit structure CS may extend to the bridge portion BP and be disposed between the connecting wire CW1 and the connecting wire CW2, but not limited thereto. In detail, the connecting wire CW1 disposed on the bridge portion BP may be formed in the process of forming the conductive layer M1 (or the gate electrode GE), and when the insulating layer IL3 covering the conductive layer M1 is formed, the insulating layer IL3 may extend to the bridge portion BP and cover the connecting wire CW1. Therefore, the connecting wire CW2 disposed on the insulating layer IL3 may be formed in the process of forming the conductive layer M2 (or the source electrode SOE/the drain electrode DOE), such that the insulating layer IL3 may separate the connecting wire CW1 and the connecting wire CW2. It should be noted that in some embodiments, other insulating layers may be disposed between the connecting wire CW1 and the connecting wire CW2, which is not limited to the insulating layer IL3. In addition to the layers above, other layers (such as the insulating layer IL1, the insulating layer IL2, the semiconductor layer SM, and the like) of the circuit structure CS may not be disposed corresponding to the bridge portion BP. Therefore, the flexibility of the flexible sensor FD may be improved, or the possibility that the circuit structure CS is broken during deformation of the flexible sensor FD may be reduced.

In some embodiments, only one connecting wire CW (for example, one of the connecting wire CW1, the connecting wire CW2 or other connecting wires CW) is disposed on a bridge portion BP, and the only one connecting wire CW may directly be disposed on the bridge portion BP, that is, the only one connecting wire CW may directly contact the bridge portion BP.

According to the present embodiment, the flexible sensor FD may further include an organic insulating layer OIL, wherein the organic insulating layer OIL is disposed on the circuit structure CS. Specifically, as shown in FIG. 2 (and FIG. 3), the organic insulating layer OIL may be disposed between the circuit structure CS and the sensing elements SE. The organic insulating layer OIL may include any suitable organic insulating material. The organic insulating material may include epoxy resin, acrylic resin (such as polymethylmetacrylate (PMMA)), benzocyclobutene (BCB), polyimide (PI), polyesters, polydimethylsiloxane (PDMS), other suitable protecting materials or combinations of the above-mentioned materials, but not limited thereto.

According to the present embodiment, as shown in FIG. 2, the organic insulating layer OIL may be disposed on the bridge portion BP or disposed corresponding to the bridge portion BP. Specifically, as mentioned above, since the circuit structure CS may not be disposed corresponding to the bridge portion BP, the organic insulating layer OIL may be disposed on the bridge portion BP and cover the connecting wire CW (for example, the connecting wire CW2). Through the above-mentioned design, the organic insulating layer OIL may provide protection of the connecting wires CW. In addition, since the organic insulating layer OIL may have better elasticity, the influence of the organic insulating layer OIL on the flexibility of the flexible sensor FD may be reduced. In some embodiments, the organic insulating layer OIL may not be disposed corresponding to the bridge portion BP.

According to the present embodiment, as shown in FIG. 3, the organic insulating layer OIL may not be disposed corresponding to the opening region OPR of the flexible sensor FD. In such condition, the organic insulating layer OIL may be a patterned layer, and the organic insulating layer OIL may include an opening OP2 corresponding to the opening region OPR. In some embodiments, the organic insulating layer OIL may be disposed corresponding to the opening region OPR. In such condition, the organic insulating layer OIL may extend downward and be filled into the opening OP1 of the stretchable substrate FS.

As shown in FIG. 2 (Or FIG. 3), the circuit structure CS (or the sub circuit structure SC) may include at least one recess RS in the present embodiment. For example, each of the sub circuit structures SC of the circuit structure CS may include one recess RS, but not limited thereto. In some embodiments, some of the sub circuit structures SC may include the recess RS while some of the sub circuit structures SC do not include the recess RS. The recess RS may be formed by removing at least a portion of the insulating layer(s) of the circuit structure CS (or the sub circuit structure SC). For example, as shown in FIG. 2, the recess RS of the present embodiment may be formed by removing a portion of the insulating layer IL1, a portion of the insulating layer IL2 and a portion of the insulating layer IL3, but not limited thereto. In some embodiments, the recess RS may be formed by removing a portion of the insulating layer IL2 and a portion of the insulating layer IL3. In some embodiments, the recess RS may be formed by removing a portion of the insulating layer IL3. According to the present embodiment, in the top view of the flexible sensor FD (as shown in FIG. 1), the recess RS may be disposed along the edges of the island portion IP. For example, the recess RS may be disposed along the edge EE1, the edge EE2, the edge EE3 and the edge EE4 of the island portion IP, but not limited thereto. In the top view of the flexible sensor FD, the recess RS disposed on an island portion IP may surround the sensing element(s) SE and the driving unit (s) DU disposed on the island portion IP. In other words, in the top view direction of the flexible sensor FD, the sensing element(s) SE and the driving unit(s) DU may be located in a range enclosed by the recess RS and are not overlapped with the recess RS. It should be noted that "the recess RS surrounds the driving unit DU" mentioned above may include the condition that the recess RS at least surrounds the semiconductor layer SM of the driving unit DU, but not limited thereto.

According to the present embodiment, the organic insulating layer OIL may be filled into the recess RS, and the portion of the organic insulating layer OIL filled into the recess RS may form an anti-cracking structure AC, but not limited thereto. In other words, the anti-cracking structure AC is disposed in the recess RS, and the material of the anti-cracking structure AC may include organic insulating materials (that is, the material of the organic insulating layer OIL). In such condition, the anti-cracking structure AC may be disposed along the edges of the island portion IP. In addition, in the top view of the flexible sensor FD, the anti-cracking structure AC may surround the sensing element(s) SE and the driving unit(s) DU. The recess RS may be used to block the crack, thereby reducing the condition that the crack extends from the recess RS inward to the sensing element (s) SE and/or the driving unit (s) DU. In addition, since the anti-cracking structure AC including organic insulating material may be disposed in the recess RS, the possibility of generation of crack in the insulating layers of the circuit structure CS may be reduced, thereby improving the reliability of the flexible sensor FD. It should be noted that although FIG. 1 shows the structure that the anti-cracking structure AC includes a ring-shaped structure and overlapped with the connecting wire CW, the present disclosure is not limited thereto. In some embodiments, in the top view of the flexible sensor FD, the anti-cracking structure AC is not overlapped with the connecting wire CW. In such condition, the anti-cracking structure AC may include a plurality of portions, and the portions of the anti-cracking structure AC are not overlapped with the connecting wire CW.

The sensing element SE may correspond to the island portion IP and be disposed on the organic insulating layer OIL. In the present embodiment, the sensing element SE may include hinge arms HG, fixed columns FP, an absorber AB and a thermistor TH, but not limited thereto. The hinge arms HG are disposed at two sides of the absorber AB and are connected to the absorber AB. The thermistor TH is disposed on the absorber AB. The hinge arm HG located at a side of the absorber AB may have an extending portion EP1, wherein the extending portion EP1 may be electrically connected to a contact CT and be electrically connected to the driving unit DU through the contact CT. For example, the flexible sensor FD may include a conductive layer M3 disposed on the organic insulating layer OIL, wherein the conductive layer M3 may form the contact CT. The contact CT may be filled into a via V1 passing through the organic insulating layer OIL and contact the driving unit DU (for example, the drain electrode DOE of the driving unit DU), thereby being electrically connected to the driving unit DU. The extending portion EP1 of the hinge arm HG may contact the contact CT, such that the sensing element SE may be electrically connected to the contact CT. Therefore, the sensing element SE may be electrically connected to the driving unit DU. The hinge arm HG located at another side of the absorber AB may have an extending portion EP2, wherein the extending portion EP2 may be electrically connected to a bias electrode BE. The bias electrode BE may for example be formed of the conductive layer M3 disposed on the organic insulating layer OIL, but not limited thereto. The bias electrode BE may provide a fixed voltage or provide an electrical signal, and when the absorber AB receive thermal radiation, the resistance of the thermistor TH may change, thereby changing the received electrical signal. Therefore, the function of sensing heat may be achieved. The fixed columns FP may be conformally disposed on the extending portion EP1 and the extending portion EP2 of the hinge arms HG, but not limited thereto. The fixed columns FP may be used to fix the hinge arms HG, thereby improving the reliability of the sensing element SE. The absorber AB may include titanium (Ti), titanium nitride (TiN), other suitable materials or combinations of the above-mentioned materials. The thermistor TH may include vanadium oxide (VOx), amorphous silicon (a-Si), other suitable materials or combinations of the above-mentioned materials. The hinge arms HG may include titanium nitride, titanium, copper (Cu), aluminum (Al), other suitable materials or combinations of the above-mentioned materials. It should be noted that the sensing element SE may include any suitable structure, which is not limited to the structure mentioned above.

According to the present disclosure, the connecting wire CW of the flexible sensor FD may further include bias lines BL, wherein the bias lines BL may be disposed on the bridge portions BP and be electrically connected between the bias electrodes BE on different island portions IP, but not limited thereto. The bias lines BL and the bias electrodes BE may be located in the same layer or may be formed of the same conductive layer (that is, the conductive layer M3). The bias lines BL and the bias electrodes BE may be formed in the same process. As shown in FIG. 2, in some embodiments, the connecting wire CW may further include a connecting wire CW3, wherein the connecting wire CW3 may be disposed on the organic insulating layer OIL. In other words, the connecting wire CW2 and the connecting wire CW3 may be separated from each other through the organic insulating layer OIL. The connecting wire CW3 may for example be the bias lines BL above, but not limited thereto. In other words, the connecting wire CW3 and the bias electrodes BE may be located in the same layer, or the connecting wire CW3 may be formed of the conductive layer M3.

According to the present embodiment, the flexible sensor FD may further include an optical element layer OEL disposed on the sensing elements SE. Specifically, as shown in FIG. 2 (or FIG. 3), the optical element layer OEL may include a plurality of optical elements OE, and the optical elements OE may respectively be disposed corresponding to one of the island portions IP. In other words, an optical element OE may be disposed on an island portion IP, but not limited thereto. In the present embodiment, the optical element OE may include a non-infrared (non-IR) cut filter CFR, anti-reflection layers ARF and an insulating layer IN, but not limited thereto. The disposition of the optical elements OE may improve accuracy of the sensing element SE. Specifically, the non-IR cut filter CFR may be used to filter non-infrared radiation to reduce the noise received by the sensing element SE, and the anti-reflection layer ARF may reduce the reflection of infrared ray. The non-IR cut filter CFR of the present embodiment may for example be cap-shaped. For example, the non-IR cut filter CFR may include a horizontal portion HP1 and a protruding portion PP1 protruding from the horizontal portion HP1, but not limited thereto. The anti-reflection layers ARF may be disposed at two sides of the non-IR cut filter CFR. Specifically, the anti-reflection layers ARF may be disposed at two sides of the horizontal portion HP1 of the non-IR cut filter CFR. For example, the anti-reflection layers ARF may respectively be disposed at the surface S1 and the surface S2 of the horizontal portion HP1 of the non-IR cut filter CFR, but not limited thereto. The insulating layer IN may be disposed on the anti-reflection layer ARF located at a side of the surface S2 of the non-IR cut filter CFR. The non-IR cut filter CFR may for example include silicon, but not limited thereto. The insulating layer IN may for example include polyimide, but not limited thereto.

According to the present embodiment, the optical elements OE may be formed on a carrier at first, and then the optical elements OE may be disposed on the island portions IP of the stretchable substrate FS through alignment bonding or counter-jointing method. Specifically, as shown in FIG. 2, the flexible sensor FD may include sealing metal layers SML1 disposed on the organic insulating layer OIL and sealing material layers SSL1 disposed on the sealing metal layers SML1. The sealing metal layers SML1 and the sealing material layers SSL1 may for example be formed on the organic insulating layer OIL after the sensing elements SE are disposed, but not limited thereto. The disposition positions of the sealing metal layers SML1 and the sealing material layers SSL1 may be determined according to the predetermined disposition positions of the optical elements OE. In addition, after the optical elements OE are formed on a carrier, sealing metal layers SML2 and sealing material layers SSL2 may be disposed on the optical elements OE (for example, on the surfaces of the protruding portions PP1 of the non-IR cut filters CFR). After that, the sealing material layers SSL1 may be aligned with the sealing material layers SSL2, and the sealing material layers SSL2 may be bonded to the sealing material layers SSL1. Therefore, the optical elements OE may be bonded onto the island portions IP of the stretchable substrate FS. In the present embodiment, the sealing metal layers SML1, the sealing material layers SSL1, the sealing metal layers SML2 and the sealing material layers SSL2 may compose sealing elements SEL, that is, the sealing elements SEL may be disposed corresponding to the island portions IP. Specifically, the flexible sensor FD may include a plurality of sealing elements SEL, and the plurality of sealing elements SEL may respectively be disposed on one of the island portions IP. According to the present embodiment, in the top view of the flexible sensor FD (as shown in FIG. 1), the sealing element SEL may be disposed along the edges (such as the edge EE1, the edge EE2, the edge EE3 and the edge EE4) of the island portions IP, and the sealing element SEL may surround the sensing element(s) SE and the driving unit(s) DU. In detail, the sealing element SEL disposed on an island portion IP may for example include a closed ring structure surrounding the sensing element(s) SE and the driving unit(s) DU disposed on the island portion IP. In addition, in the present embodiment, the sealing element SEL may further surround the recess RS (or the anti-cracking structure AC), but not limited thereto.

It should be noted that in order to simplify the figure, FIG. 3 and the following figures just exemplarily show the sealing elements SEL and the optical elements OE, and the structures thereof may refer to the contents mentioned above, and will not be redundantly described.

As shown in FIG. 2, after the optical elements OE are bonded onto the island portions IP and form the sealing elements SEL, a space SP may be formed between the optical element OE, the sealing element SEL and the organic insulating layer OIL. The space SP may correspond to the island portion IP. Specifically, one space SP may exist on each of the island portions IP. The space SP may be used to contain the sensing element SE, that is, the sensing element SE may be disposed in the space SP. In the present embodiment, since one sensing element SE is disposed on an island portion IP, one sensing element SE is contained in each of the spaces SP. According to the present embodiment, the space SP may be in a vacuum state. Therefore, the condition that heat is transferred to the sensing element SE through other ways may be reduced, thereby improving accuracy of the sensing element SE.

According to the present embodiment, the flexible sensor FD may further include a supporting film SUF, wherein the supporting film SUF may be disposed under the stretchable substrate FS. The supporting film SUF of the present embodiment may include the flexible substrate or at least partially include the flexible substrate. The material of the supporting film SUF may refer to the material of the stretchable substrate FS mentioned above, but not limited thereto. In some embodiments, the supporting film SUF and the stretchable substrate FS may include the same material. In some embodiments, the material of the supporting film SUF and the material of the stretchable substrate FS may be different. In addition, although the supporting film SUF is shown as a single layer in FIG. 2 (and FIG. 3), the present embodiment is not limited thereto. In some embodiments, the supporting film SUF may include a multi-layer structure.

According to the present embodiment, the supporting film SUF may be disposed corresponding to the island portions IP of the stretchable substrate FS. Specifically, the supporting film SUF may be disposed under the island portions IP of the stretchable substrate FS. The supporting film SUF may be used to support other layers and/or structures disposed thereon. In other words, by making the supporting film SUF disposed corresponding to the island portions IP, the supporting film SUF may provide support to the elements and/or the layers (such as the sub circuit structure SC, the sensing element SE, the optical element OE, and the like) disposed on the island portions IP. In the present embodiment, the supporting film SUF may be made of materials with better elasticity, such that the stretchability of the flexible sensor FD may be improved.

According to the present embodiment, as shown in FIG. 2, the supporting film SUF may not be disposed corresponding to the bridge portion BP of the stretchable substrate FS, but not limited thereto. In some embodiments, the supporting film SUF may be disposed corresponding to the bridge portions BP (for example, shown in FIG. 11). Specifically, the supporting film SUF may be a patterned layer and include openings OP3, wherein the openings OP3 may correspond to the bridge portions BP. In detail, an entire material layer of the supporting film SUF may be disposed under the stretchable substrate FS at first, and a portion of the supporting film SUF corresponding to the bridge portions BP may be removed in the patterning process of the supporting film SUF to form the openings OP3. The openings OP3 may expose the surfaces of the bridge portions BP, but the present disclosure is not limited thereto. In some embodiments, the openings OP3 may be formed by removing a portion of the supporting film SUF. In such condition, the supporting film SUF may be disposed corresponding to the bridge portions BP, and a thickness of the portion of the supporting film SUF corresponding to the bridge portion BP may be lower than a thickness of the portion of the supporting film SUF corresponding to the island portion IP. By making the supporting film SUF not disposed corresponding to the bridge portion BP, the flexibility of the flexible sensor FD may be improved.

According to the present embodiment, as shown in FIG. 3, the supporting film SUF may be disposed corresponding to the opening regions OPR. In such condition, since the circuit structure CS and the organic insulating layer OIL are not disposed corresponding to the opening region OPR in the present embodiment, the surface of the portion of the supporting film SUF corresponding to the opening regions OPR may be exposed, but not limited thereto. In some embodiments, the supporting film SUF may not be disposed corresponding to the opening region OPR. It should be noted that although it is not shown in the figure, the flexible sensor FD may further include a polymer material disposed corresponding to the opening regions OPR. Specifically, the polymer material may be filled in the opening regions OPR (for example, the opening regions OPR may be fully filled). Therefore, the flexibility of the flexible sensor FD may be improved. The feature that the polymer material is disposed corresponding to the opening regions OPR may be applied to each of the embodiments and variant embodiments of the present disclosure, and will not be redundantly described.

It should be noted that the structure of the flexible sensor FD of the present embodiment is not limited to the contents mentioned above and the structures shown in FIG. 1 to FIG. 3, and the flexible sensor FD may include any suitable element and/or layer. Other embodiments of the present disclosure will be described in the following. In order to simplify the description, the same elements or layers in the following embodiments would be labeled with the same symbol, and the features thereof will not be redundantly described. The differences between the embodiments will be detailed in the following. In addition, FIG. 1 to FIG. 3 just show a portion of the flexible sensor FD. For example, in some embodiments, the flexible sensor FD of the present disclosure may include a repeated structure in which a plurality of structures shown in FIG. 1 to FIG. 3 are connected to each other. The structures in the following embodiments may be the same, and will not be redundantly described.

Figure 4:
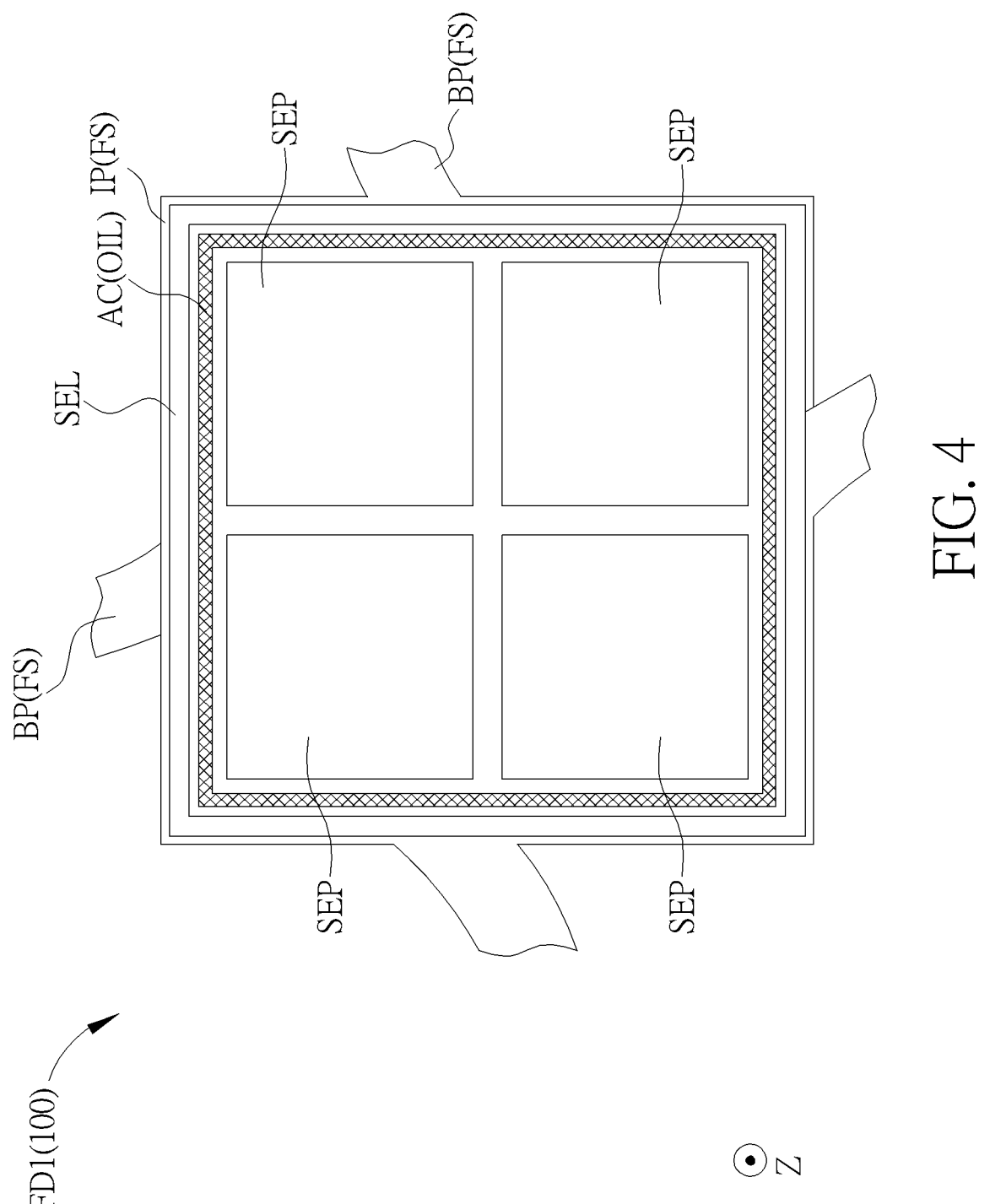
FIG. 4 schematically illustrates a top view of an electronic device according to a second embodiment of the present disclosure.
Figure 5:
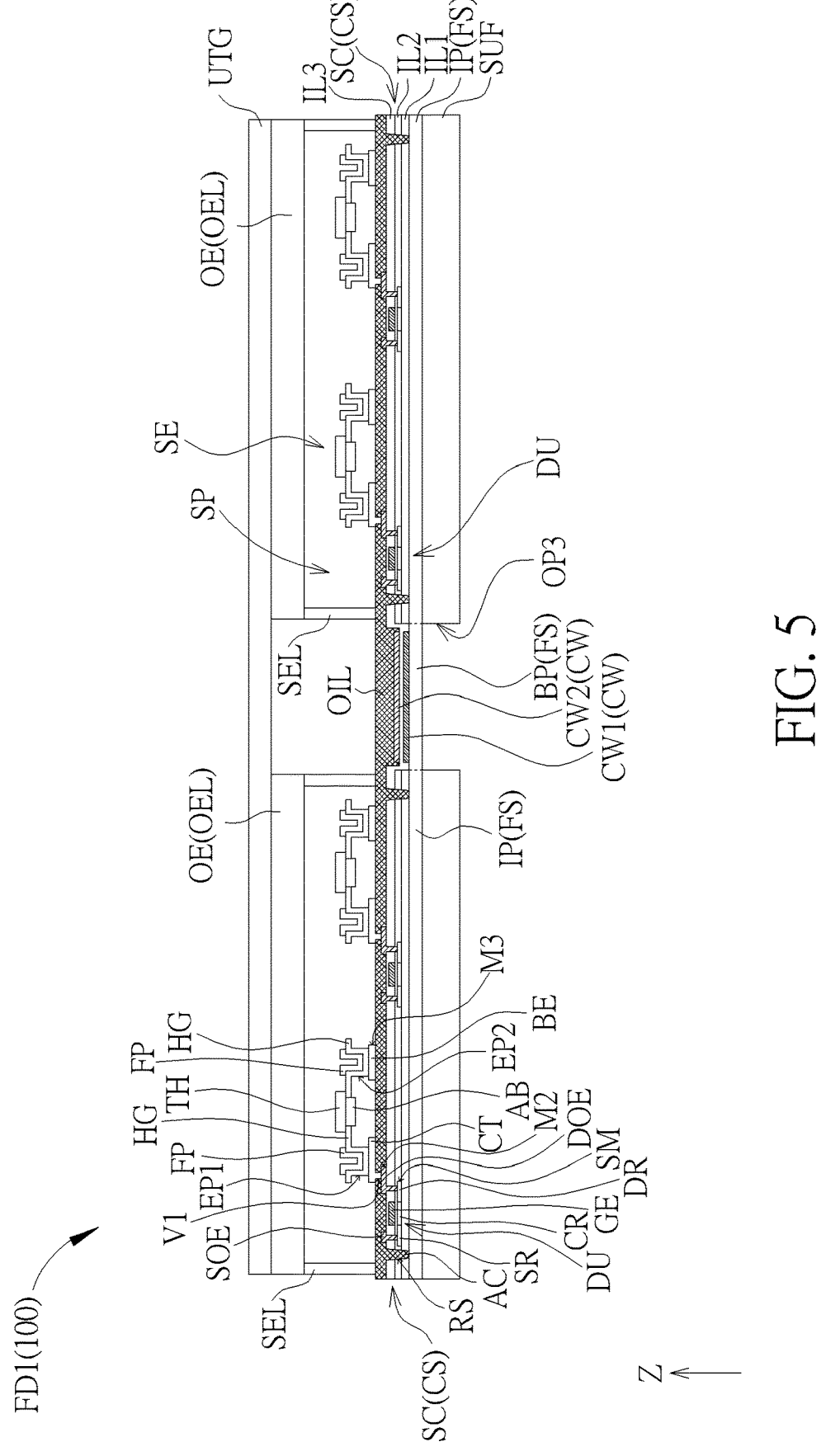
FIG. 5 schematically illustrates a cross-sectional view of the electronic device according to the second embodiment of the present disclosure.

Referring to FIG. 4 and FIG. 5, FIG. 4 schematically illustrates a top view of an electronic device according to a second embodiment of the present disclosure, and FIG. 5 schematically illustrates a cross-sectional view of the electronic device according to the second embodiment of the present disclosure. In order to simplify the figure, FIG. 4 just shows an island portion IP of the stretchable substrate FS and some of the elements disposed on the island portion IP, and other elements and/or layers are omitted in FIG. 4. The electronic device 100 of the present embodiment may include the flexible sensor FD1. According to the present embodiment, multiple sensing elements SE may be disposed on an island portion IP of the stretchable substrate FS of the flexible sensor FD1. In addition, a sub circuit structure SC disposed corresponding to an island portion IP may include a plurality of driving units DU respectively be electrically connected to one of the sensing elements SE disposed on the island portion IP. For example, as shown in FIG. 4, four sensing pixels SEP may be disposed on an island portion IP of the stretchable substrate FS of the flexible sensor FD1, but not limited thereto. In the present embodiment, a sensing pixel SEP may for example be defined by a sensing element SE and the driving unit DU electrically connected to the sensing element SE. Therefore, the structure shown in FIG. 1 may include a sensing pixel SEP disposed on an island portion IP. In other words, in the flexible sensor FD1 of the present embodiment, four sensing elements SE may be disposed on an island portion IP. In order to simplify the figure, FIG. 4 just exemplarily shows the sensing pixels SEP as frames, and the structures of the driving units DU and the sensing elements SE included in the sensing pixels SEP may refer to the structures described in contents above and shown in FIG. 1 to FIG. 3, and will not be redundantly described. In the present embodiment, the sensing pixels SEP (or the sensing elements SE) disposed on an island portion IP may for example be arranged in an array, but not limited thereto. For example, as shown in FIG. 4, the sensing pixels SEP disposed on an island portion IP may be arranged in a 2*2 array, but not limited thereto.

According to the present embodiment, in the top view of the flexible sensor FD1 (as shown in FIG. 4), the sealing element SEL and the anti-cracking structure AC disposed on an island portion IP may be disposed along the edges of the island portion IP, and the sealing element SEL and the anti-cracking structure AC may surround the sensing pixels SEP disposed on the island portion IP or surround the sensing elements SE and the driving units DU disposed on the island portion IP. In addition as shown in FIG. 5, since multiple sensing elements SE are disposed on an island portion IP of the stretchable substrate FS, a space formed by the sealing element SEL, the optical element OE and the organic insulating layer OIL may contain multiple sensing elements SE.

In some embodiments, as shown in FIG. 5, the flexible sensor FD1 may further include a glass layer UTG, wherein the glass layer UTG may be disposed on the optical element layer OEL or disposed on the optical elements OE. In the present embodiment, the glass layer UTG may be the glass layer with a thickness lower than 300 micrometers (μm), but not limited thereto. In some embodiments, as shown in FIG. 5, the glass layer UTG may be a continuous layer disposed on the optical element layer OEL. In some embodiments, the glass layer UTG may be a patterned layer, wherein the glass layer UTG may be disposed corresponding to the island portions IP. In other words, the glass layer UTG may be disposed on the island portions IP. In some embodiments, although it is not shown in the figure, a stretchable polymer material may be filled between the glass layer UTG and the organic insulating layer OIL.

It should be noted that although the structure of the portion of the flexible sensor FD1 corresponding to the opening region OPR is not shown in the figure, the structure thereof may refer to the structure shown in FIG. 3 or other structures of other embodiments or variant embodiments of the present disclosure, and the present disclosure is not limited thereto.

Figure 6:
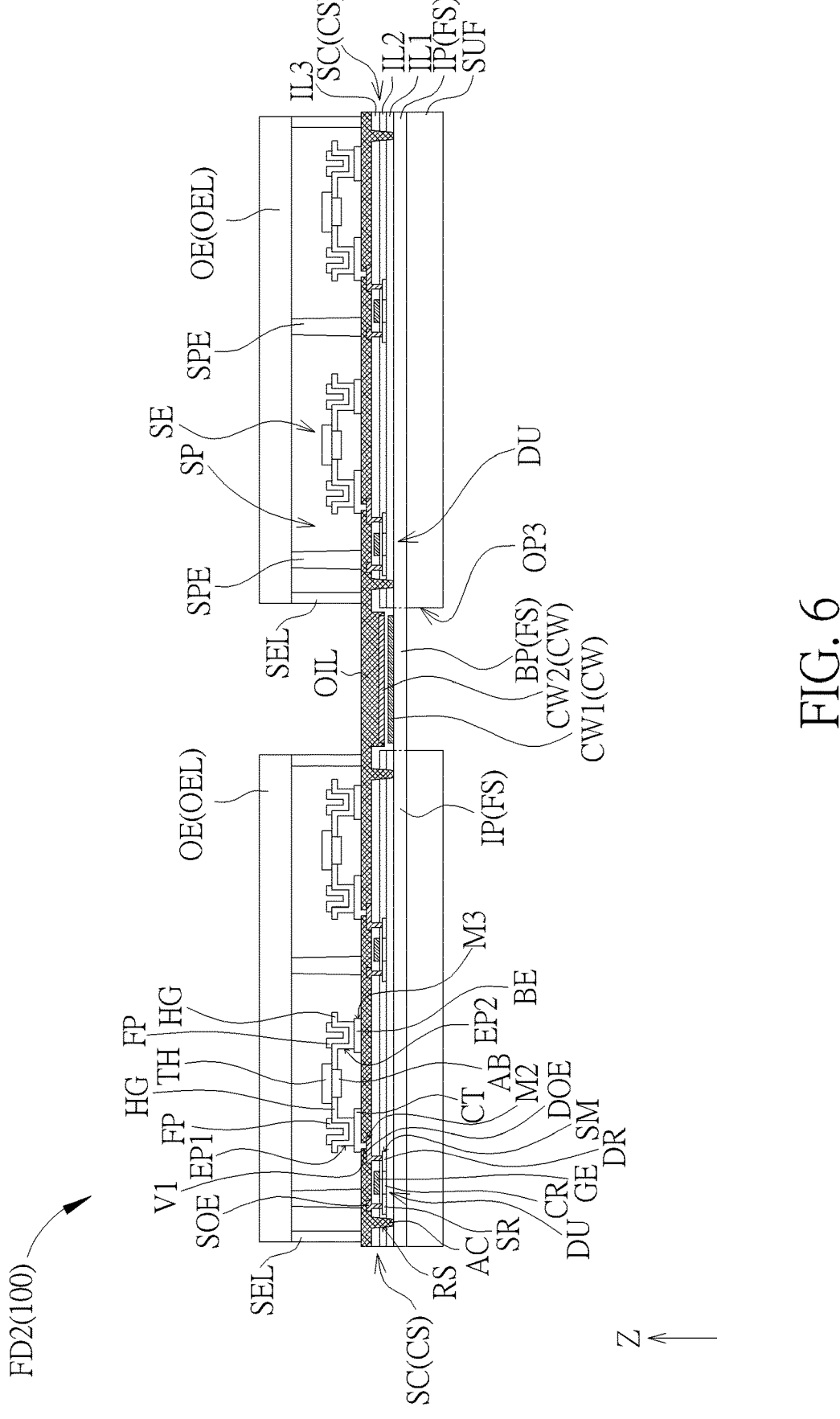
FIG. 6 schematically illustrates a cross-sectional view of an electronic device according to a third embodiment of the present disclosure.
Figure 7:
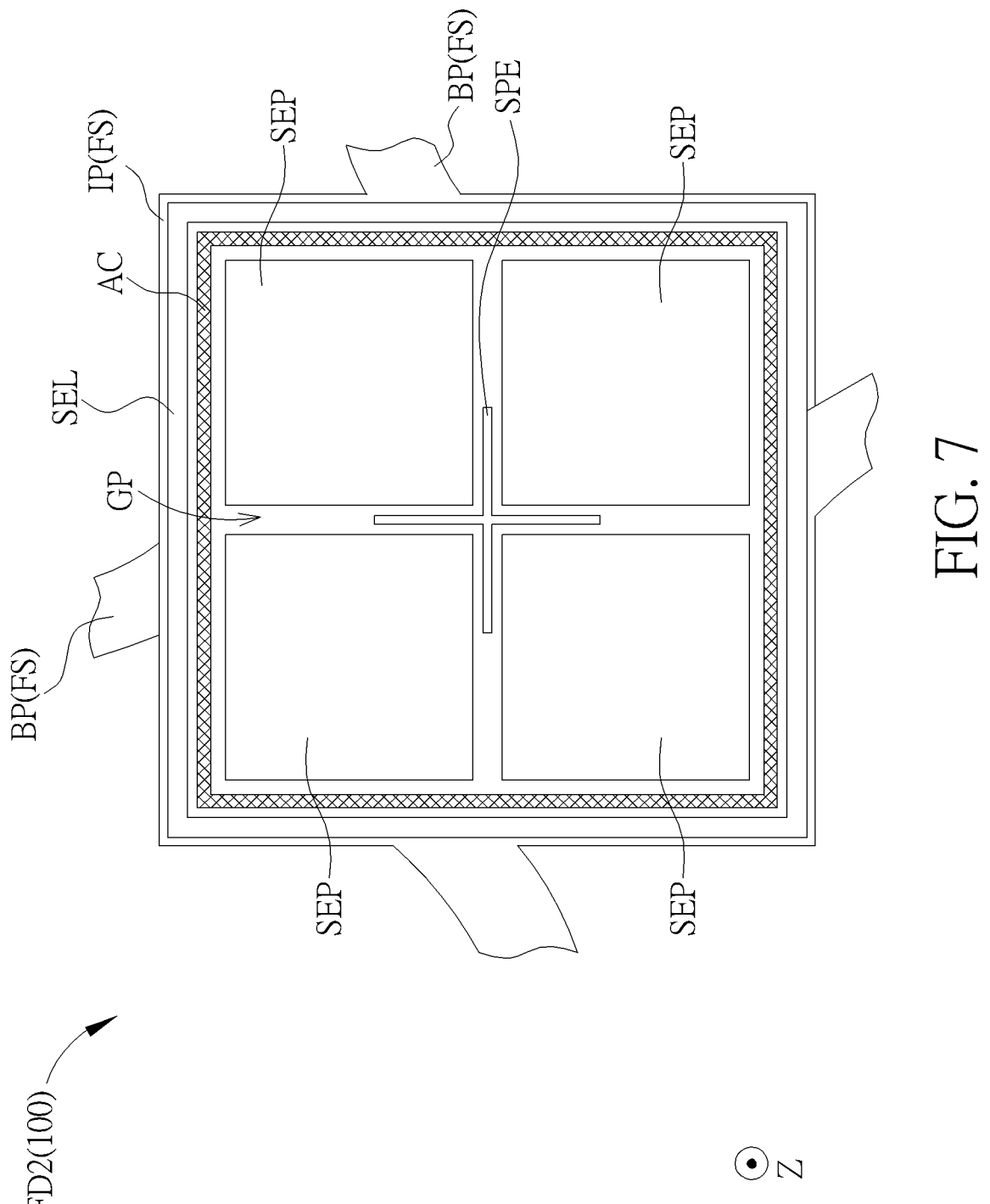
FIG. 7 schematically illustrates a top view of an electronic device according to a variant embodiment of the third embodiment of the present disclosure.

Referring to FIG. 6 and FIG. 7, FIG. 6 schematically illustrates a cross-sectional view of an electronic device according to a third embodiment of the present disclosure, and FIG. 7 schematically illustrates a top view of an electronic device according to a variant embodiment of the third embodiment of the present disclosure. In order to simplify the figure, FIG. 7 just shows an island portion IP of the stretchable substrate FS and some of the elements disposed on the island portion IP, and other elements and/or layers are omitted in FIG. 7. The electronic device 100 of the present embodiment may include a flexible sensor FD2. According to the present embodiment, the flexible sensor FD2 may further include supporting spacers SPE, wherein the supporting spacers SPE may be disposed corresponding to the island portions IP of the stretchable substrate FS. Specifically, the supporting spacers SPE may be disposed on the island portions IP and connected between the organic insulating layer OIL and the optical elements OE. In other words, the supporting spacer SPE may contact the organic insulating layer OIL and the optical element OE. One or more supporting spacers SPE may be disposed on an island portion IP. In the top view of the flexible sensor FD2, the supporting spacer SPE may not overlap the sensing element SE. For example, multiple sensing elements SE may be disposed on an island portion IP of the stretchable substrate FS of the flexible sensor FD2 in the present embodiment, and the supporting spacers SPE may be disposed between the multiple sensing elements SE, or the supporting spacers SPE and the sensing elements SE may be disposed to be misaligned with each other, but not limited thereto. In some embodiments, a sensing element SE may be disposed on an island portion IP of the stretchable substrate FS of the flexible sensor FD2, and the supporting spacer SPE may be disposed on the island portion IP at any suitable position not corresponding to the sensing element SE. The supporting spacers SPE may provide support to the optical elements OE (or the optical element layer OEL) disposed on the sensing elements SE, thereby improving the reliability of the flexible sensor FD2.

In some embodiments, as shown in FIG. 7, multiple sensing pixels SEP (that is, multiple sensing elements SE) may be disposed on an island portion IP of the stretchable substrate FS of the flexible sensor FD2, and these sensing pixels SEP may be arranged in an array. In such condition, the supporting spacer SPE may be disposed in the gap GP between the sensing pixels SEP. For example, in the top view of the flexible sensor FD2 (as shown in FIG. 7), the supporting spacer SPE may include a cross shape and be disposed in the gap GP, but not limited thereto.

It should be noted that the structure of the portion of the flexible sensor FD2 corresponding to the opening region OPR may refer to the structure shown in FIG. 3 or other structures of other embodiments or variant embodiments of the present disclosure, and the present disclosure is not limited thereto.

Figure 8:
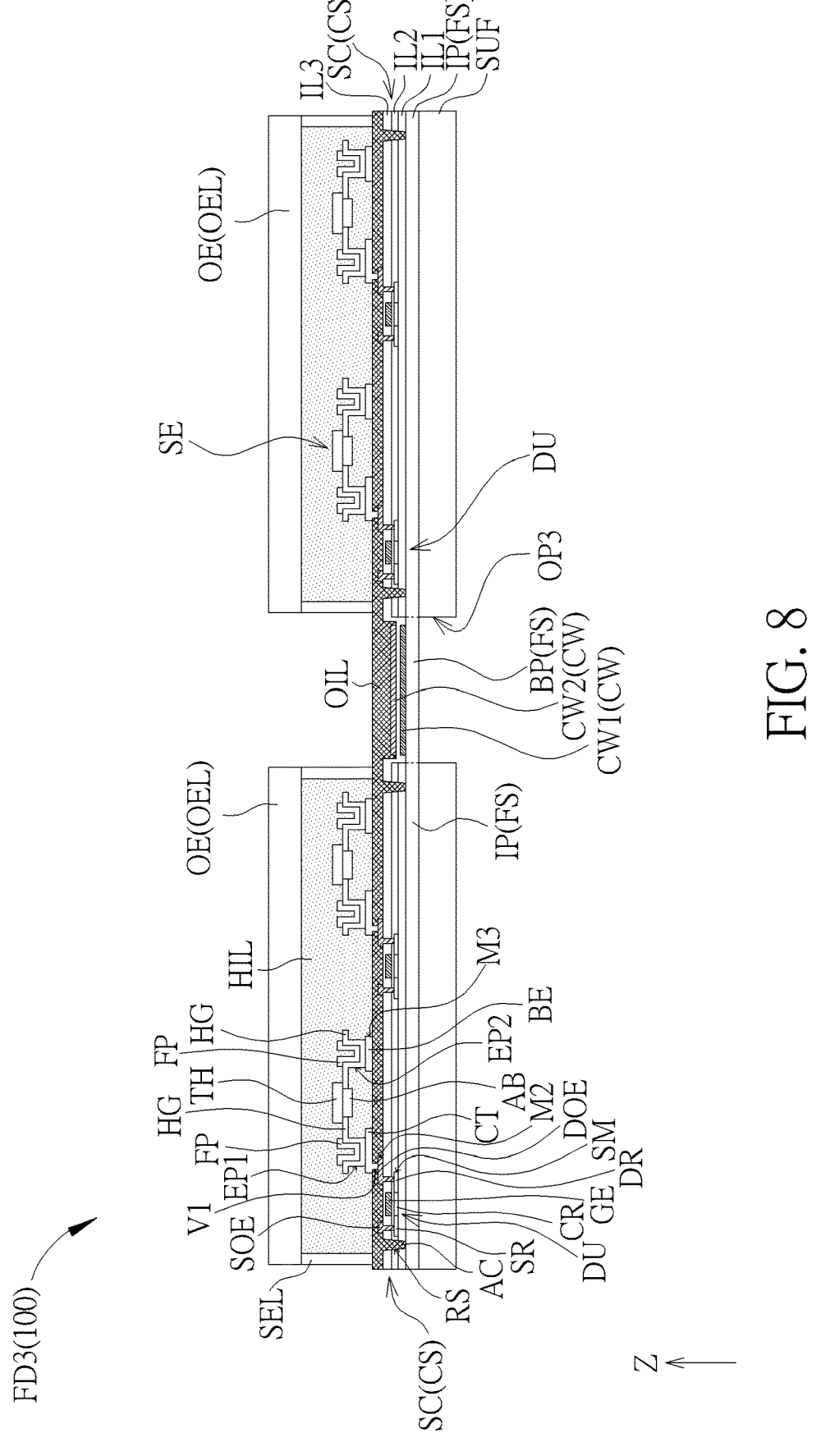
FIG. 8 schematically illustrates a cross-sectional view of an electronic device according to a fourth embodiment of the present disclosure.
Figure 9:
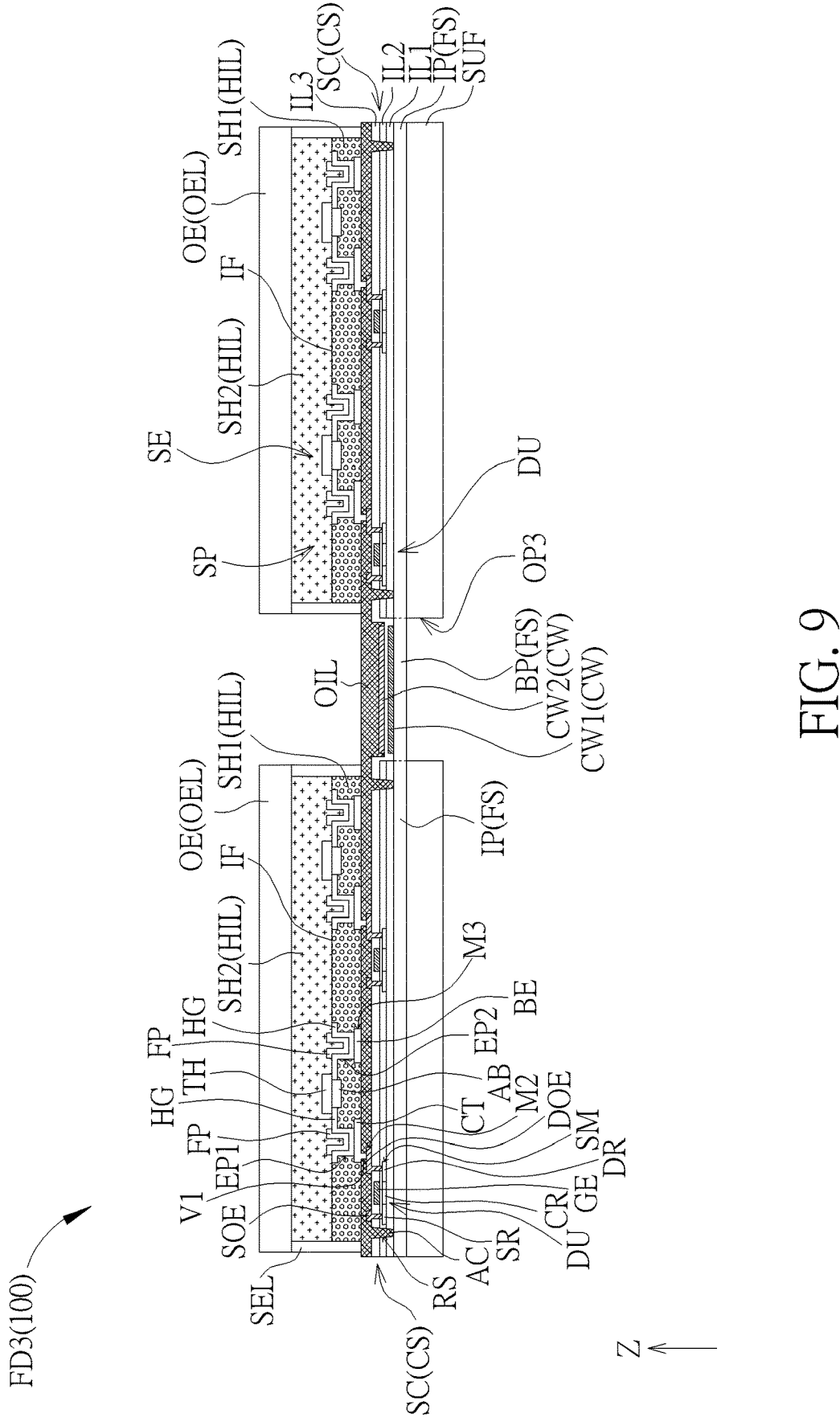
FIG. 9 schematically illustrates a cross-sectional view of an electronic device according to a variant embodiment of the fourth embodiment of the present disclosure.

Referring to FIG. 8 and FIG. 9, FIG. 8 schematically illustrates a cross-sectional view of an electronic device according to a fourth embodiment of the present disclosure, and FIG. 9 schematically illustrates a cross-sectional view of an electronic device according to a variant embodiment of the fourth embodiment of the present disclosure. The electronic device 100 of the present embodiment may include a flexible sensor FD3. According to the present embodiment, the flexible sensor FD3 may include a heat insulating layer HIL, wherein the heat insulating layer HIL may be disposed on the island portion IP and cover the sensing elements SE. Specifically, the heat insulating layer HIL may be disposed in the space SP formed by the sealing element SEL, the optical element OE and the organic insulating layer OIL and cover the sensing elements SE. The heat insulating layer HIL may contact the optical element OE and the organic insulating layer OIL. The heat insulating layer HIL may include any suitable material with low thermal conductivity, such as silicon dioxide ($SiO_2$), silicon nitride ($Si_3N_4$), titanium oxide (TiO), aluminum oxide (AlO), other suitable materials or combinations of the above-mentioned materials. The heat insulating layer HIL may provide support to the optical elements OE (or the optical element layer OEL) disposed on the sensing elements SE, thereby improving the reliability of the flexible sensor FD3. In addition, since the heat insulating layer HIL includes the material of low thermal conductivity, the possibility that heat is transferred to the sensing elements SE in other ways may be reduced by making the heat insulating layer HIL covering the sensing elements SE, thereby improving the accuracy of the sensing elements SE.

In some embodiments, as shown in FIG. 9, the heat insulating layer HIL disposed in the space SP may include a first sub heat insulating layer SH1 and a second sub heat insulating layer SH2, wherein the second sub heat insulating layer SH2 may be disposed on the first sub heat insulating layer SH1. An interface IF between the first sub heat insulating layer SH1 and the second sub heat insulating layer SH2 may for example be aligned with the bottom surface of the thermistor TH, but not limited thereto. In other words, the second sub heat insulating layer SH2 may cover the thermistor TH in the sensing element SE. The materials of the first sub heat insulating layer SH1 and the second sub heat insulating layer SH2 may refer to the material of the heat insulating layer HIL mentioned above, and will not be redundantly described. In the present embodiment, the coefficient of thermal expansion (CTE) of the second sub heat insulating layer SH2 may be greater than the coefficient of thermal expansion of the first sub heat insulating layer SH1. Specifically, the first sub heat insulating layer SH1 and the second sub heat insulating layer SH2 may include different materials, wherein the coefficient of thermal expansion of the material of the second sub heat insulating layer SH2 may be greater than the coefficient of thermal expansion of the material of the first sub heat insulating layer SH1. By making the coefficient of thermal expansion of the second sub heat insulating layer SH2 covering the thermistor TH greater than the coefficient of thermal expansion of the first sub heat insulating layer SH1, the possibility of damage to the thermistor TH during the heat expansion process may be reduced.

The feature that the heat insulating layer HIL is disposed on the island portion IP of the present embodiment may be applied to each of the embodiments and variant embodiments of the present disclosure. In addition, the structure of the portion of the flexible sensor FD3 corresponding to the opening region OPR may refer to the structure shown in FIG. 3 or other structures of other embodiments or variant embodiments of the present disclosure, and the present disclosure is not limited thereto.

Figure 10:
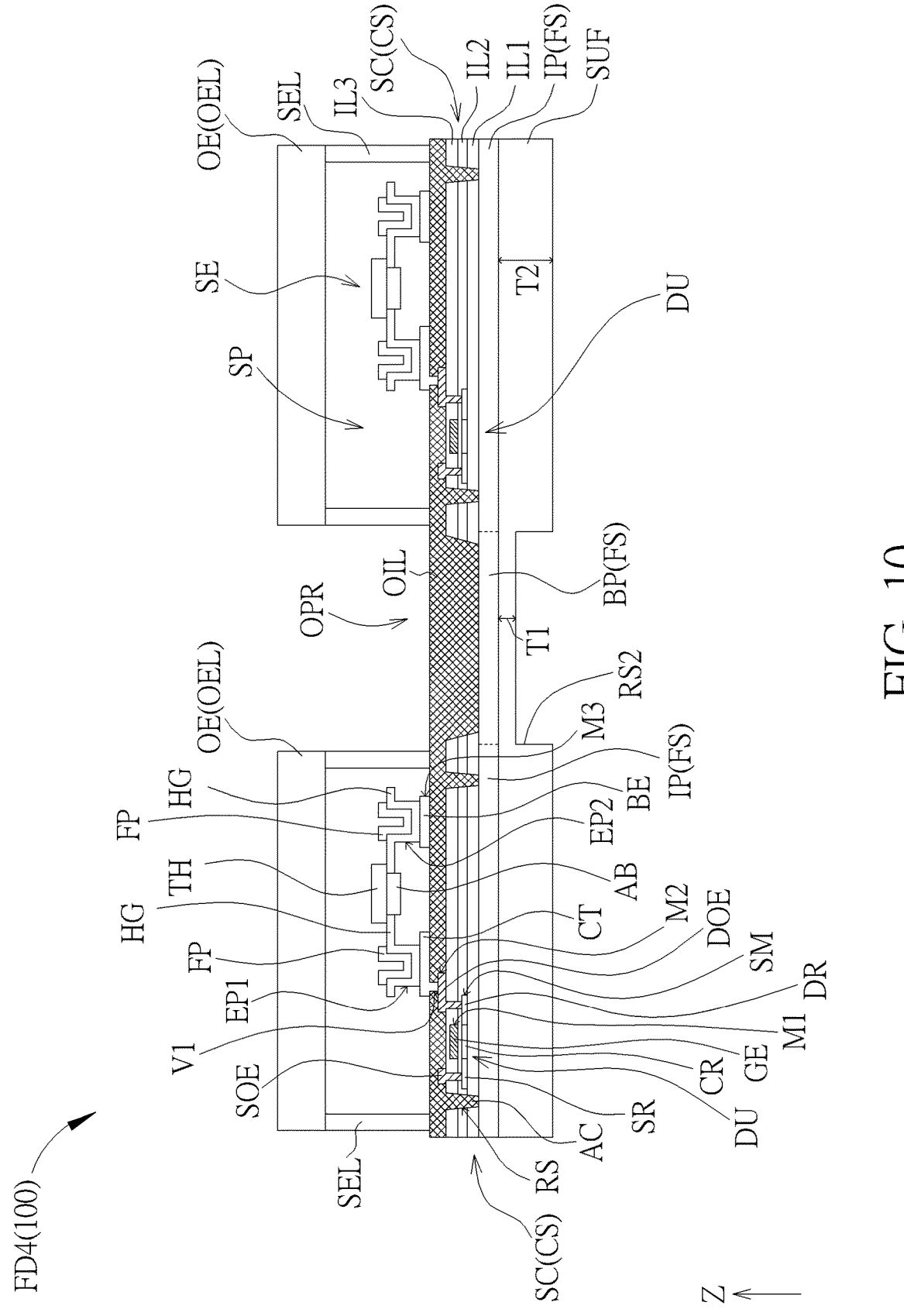
FIG. 10 schematically illustrates a cross-sectional view of an electronic device according to a fifth embodiment of the present disclosure.

Referring to FIG. 10, FIG. 10 schematically illustrates a cross-sectional view of an electronic device according to a fifth embodiment of the present disclosure. The electronic device 100 of the present embodiment may include a flexible sensor FD4. FIG. 10 shows the structure of the portion of the flexible sensor FD4 corresponding to the opening region OPR, and the structure of other portions of the flexible sensor FD4 may refer to the contents of the embodiments and variant embodiments of the present disclosure. According to the present embodiment, the stretchable substrate FS of the flexible sensor FD4 may be disposed corresponding to the opening regions OPR. In other words, the stretchable substrate FS may be a continuous layer and not be patterned in the present embodiment. In such condition, the portion of the stretchable substrate FS corresponding to the sensing elements SE, the optical elements OE, and the like may be defined as the island portions IP, the portion of the stretchable substrate FS corresponding to the connecting wires CW may be defined as the bridge portions BP, and the remaining portion of the stretchable substrate FS may correspond to the opening regions OPR.

In the present embodiment, the organic insulating layer OIL may be disposed corresponding to the opening regions OPR. Specifically, as shown in FIG. 10, the organic insulating layer OIL may be disposed on the portion of the stretchable substrate FS corresponding to the opening region OPR. Since the circuit structure CS and the connecting wire CW may not be disposed corresponding to the opening region OPR, the organic insulating layer OIL may directly be disposed on the stretchable substrate FS. In other words, the organic insulating layer OIL may directly contact the stretchable substrate FS in the opening region OPR.

In the present embodiment, the portion of the supporting film SUF corresponding to the opening region OPR may include at least one recess RS2. The recess RS2 may be formed by partially removing the portion of the supporting film SUF corresponding to the opening region OPR. In such condition, a thickness of the portion of the supporting film SUF corresponding to the opening region OPR may be lower than a thickness of the portion of the supporting film SUF corresponding to the island portion IP. For example, the portion of the supporting film SUF corresponding to the opening region OPR may have a thickness T1, and the portion of the supporting film SUF corresponding to the island portion IP may have a thickness T2, wherein the thickness T1 may be lower than the thickness T2. Through the above-mentioned design, the flexibility of the flexible sensor FD4 may be improved. In some embodiments, the portion of the supporting film SUF corresponding to the opening region OPR may be completely removed when forming the recess RS2. In such condition, the recess RS2 may expose the surface of the stretchable substrate FS, or the supporting film SUF may not be disposed corresponding to the opening region OPR.

It should be noted that the structural design of the portion of the flexible sensor FD4 corresponding to the opening region OPR in the present embodiment may be applied to each of the embodiments and variant embodiments of the present disclosure. In addition, the structure of the portion of the flexible sensor FD4 corresponding to the bridge portion BP may refer to the structures of other embodiments or variant embodiments of the present disclosure, and the present disclosure is not limited thereto.

Figure 11:
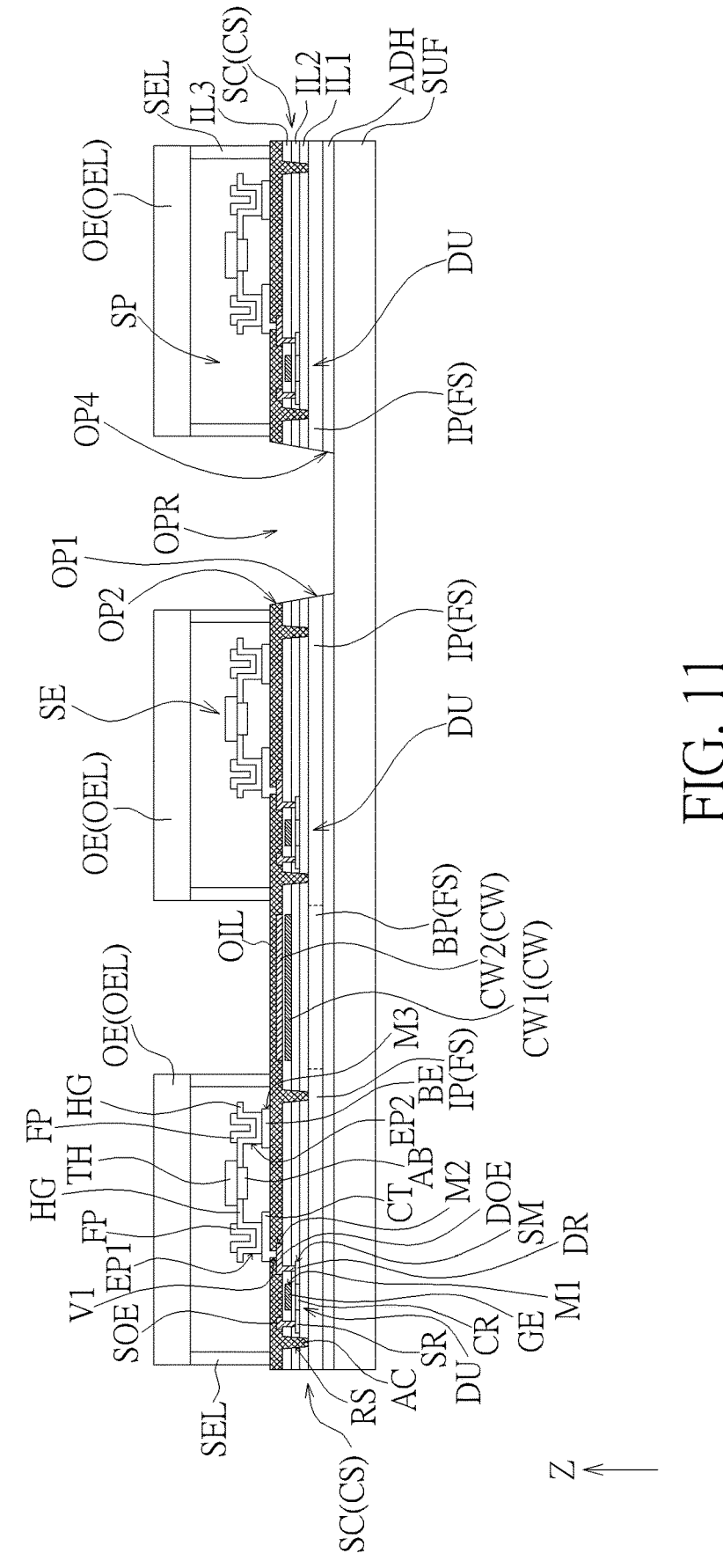
FIG. 11 schematically illustrates a cross-sectional view of an electronic device according to a sixth embodiment of the present disclosure.

Referring to FIG. 11, FIG. 11 schematically illustrates a cross-sectional view of an electronic device according to a sixth embodiment of the present disclosure. The electronic device 100 of the present embodiment may include a flexible sensor FD5. According to the present embodiment, the flexible sensor FD5 may include an adhesive layer ADH disposed between the stretchable substrate FS and the supporting film SUF. The adhesive layer ADH may be used to attach the supporting film SUF to the stretchable substrate FS. The adhesive layer ADH may include any suitable adhesive material. In the present embodiment, the adhesive layer ADH may be disposed corresponding to the stretchable substrate FS, that is, the adhesive layer ADH may be disposed corresponding to the island portions IP and the bridge portions BP of the stretchable substrate FS. The adhesive layer ADH may be a patterned layer, wherein the pattern of the adhesive layer ADH may be the same as the pattern of the stretchable substrate FS, but not limited thereto. For example, the stretchable substrate FS of the present embodiment may be patterned and not be disposed corresponding to the opening region OPR (may refer to the stretchable substrate FS shown in FIG. 2), and the adhesive layer ADH disposed corresponding to the stretchable substrate FS may not be disposed corresponding to the opening region OPR. For example, the adhesive layer ADH may include the opening OP4 corresponding to the opening region OPR, but not limited thereto. In addition, the supporting film SUF of the present embodiment may for example be a continuous layer, that is, the supporting film SUF may be disposed corresponding to the stretchable substrate FS and the opening region OPR, but not limited thereto.

In addition, in the present embodiment, the insulating layers (such as the insulating layer IL1, the insulating layer IL2 and the insulating layer IL3) in the circuit structure CS may be disposed on the bridge portion BP of the stretchable substrate FS, that is, the portions of the insulating layers in the circuit structure CS corresponding to the bridge portion BP may not be removed, but not limited thereto. In such condition, the connecting wire CW disposed on the bridge portion BP of the stretchable substrate FS may not directly contact the stretchable substrate FS. In some embodiments, the structure of the portion of the flexible sensor FD5 corresponding to the bridge portion BP may be the structure shown in FIG. 2.

Figure 12:
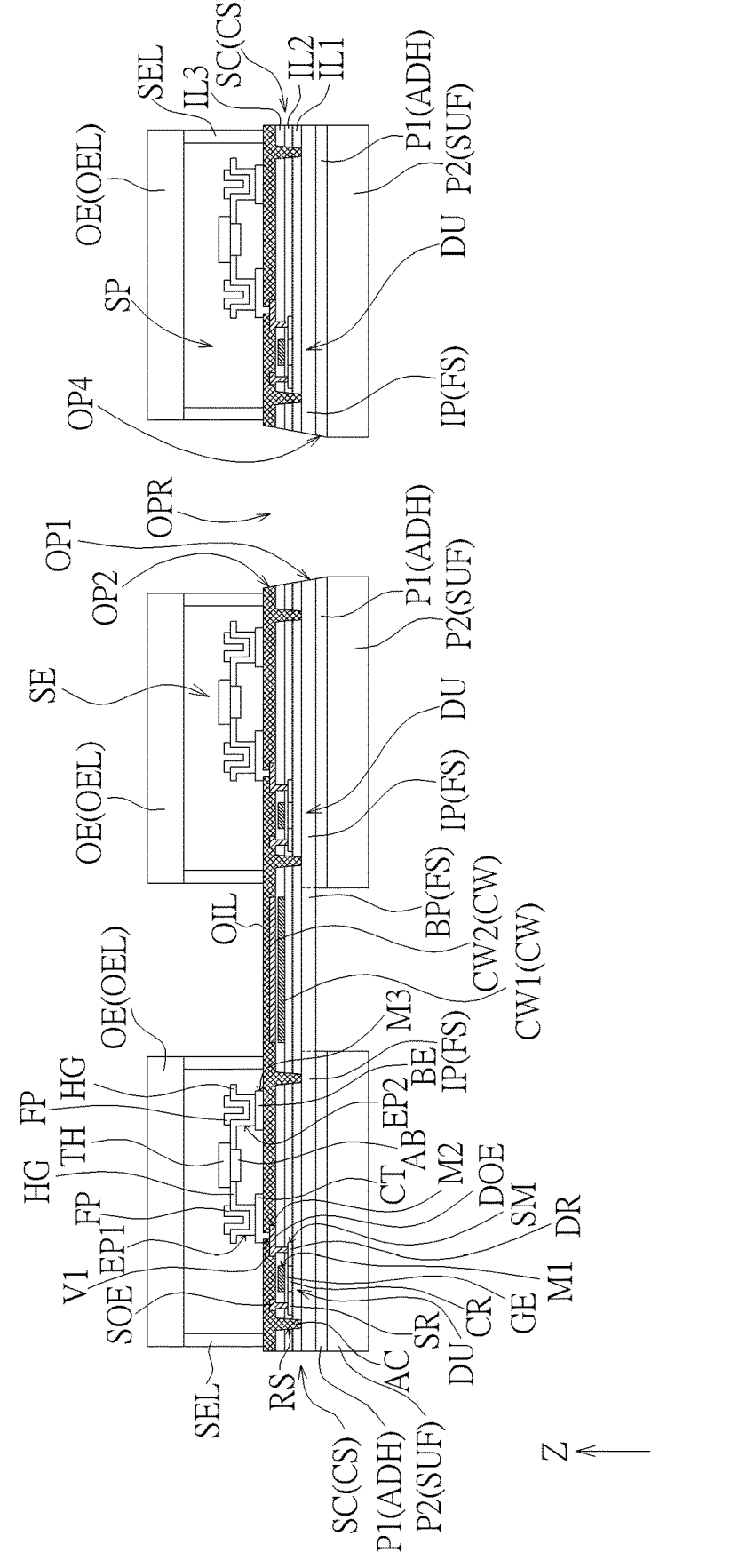
FIG. 12 schematically illustrates a cross-sectional view of an electronic device according to a variant embodiment of the sixth embodiment of the present disclosure.

Referring to FIG. 12, FIG. 12 schematically illustrates a cross-sectional view of an electronic device according to a variant embodiment of the sixth embodiment of the present disclosure. One of the main differences between the structure shown in FIG. 12 and the structure shown in FIG. 11 is the structural designs of the supporting film SUF and the adhesive layer ADH. In the present variant embodiment, the adhesive layer ADH of the flexible sensor FD5 may be a patterned layer, wherein the adhesive layer ADH may be disposed corresponding to the island portions IP but not corresponding to the bridge portion BP. In other words, the adhesive layer ADH may be disposed corresponding to a portion of the stretchable substrate FS. In such condition, the adhesive layer ADH may include a plurality of portions P1 respectively correspond to an island portion IP, wherein the plurality of portions P1 may be independent and separated from each other. The pattern of the portion P1 may substantially be the same as the pattern of the island portion IP, but not limited thereto.

In the present variant embodiment, the supporting film SUF may be a patterned layer disposed corresponding to the island portions IP of the stretchable substrate FS. Specifically, the supporting film SUF may not be disposed corresponding to the opening region OPR and the bridge portion BP. In such condition, the supporting film SUF may include a plurality of portions P2 respectively correspond to an island portion IP, wherein the plurality of portions P2 may be independent and separated from each other. In the present variant embodiment, a portion P1 of the adhesive layer ADH may correspond to a portion P2 of the supporting film SUF. In addition, the portion P1 of the adhesive layer ADH and the portion P2 of the supporting film SUF may for example have the same pattern, such as the pattern of the island portion IP, but not limited thereto.

The feature that the flexible sensor FD5 includes the adhesive layer ADH mentioned above may be applied to each of the embodiments and variant embodiments of the present disclosure.

Figure 13:
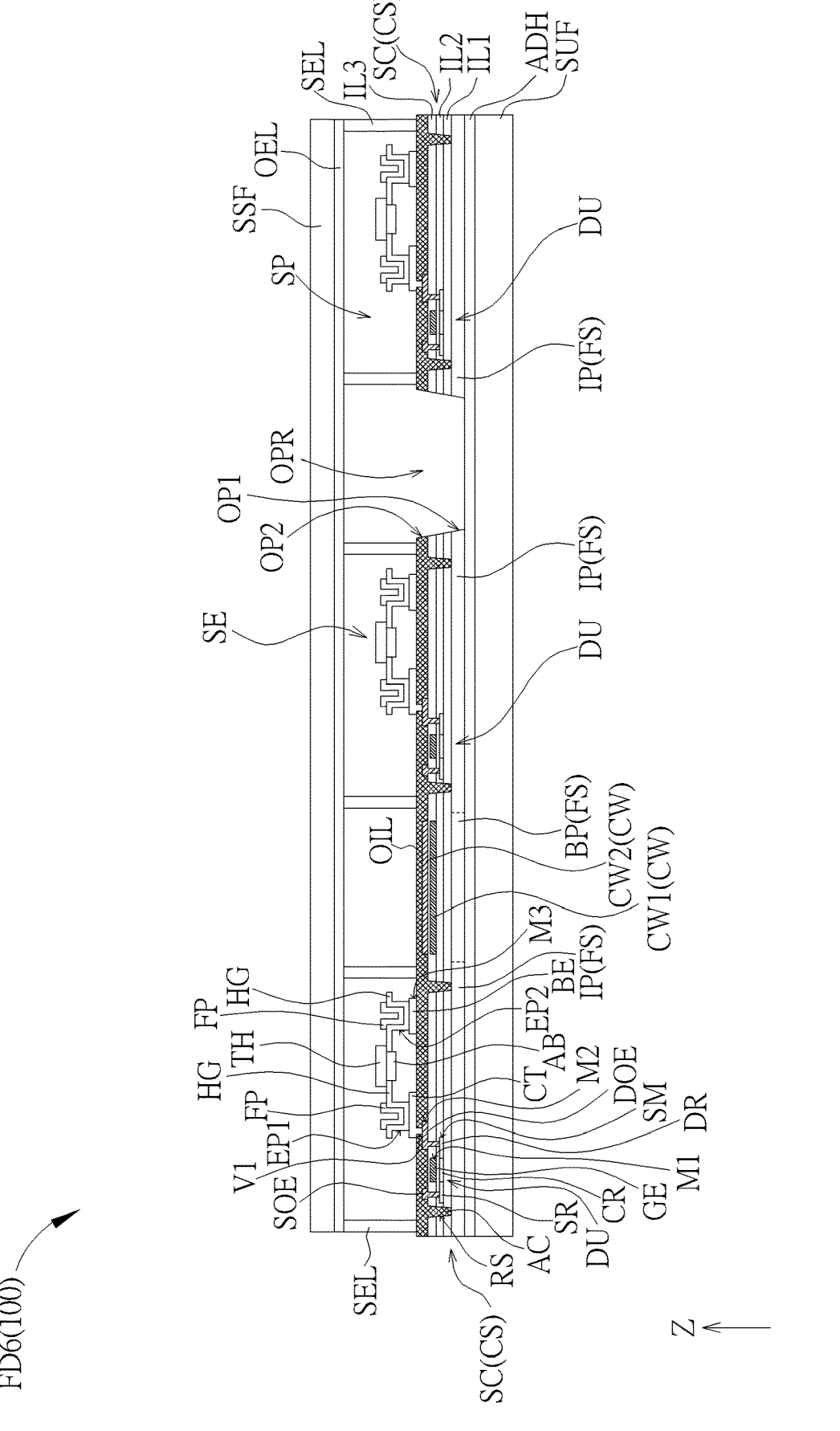
FIG. 13 schematically illustrates a cross-sectional view of an electronic device according to a seventh embodiment of the present disclosure.

Referring to FIG. 13, FIG. 13 schematically illustrates a cross-sectional view of an electronic device according to a seventh embodiment of the present disclosure. The electronic device 100 of the present embodiment may include a flexible sensor FD6. According to the present embodiment, the flexible sensor FD6 may include a stretchable supporting film SSF disposed on the optical element layer OEL. Specifically, the stretchable supporting film SSF may be a continuous layer disposed on the optical element layer OEL, but not limited thereto. The stretchable supporting film SSF may include any suitable flexible material. The material of the stretchable supporting film SSF may refer to the material of the supporting film SUF, that is, the material of the stretchable substrate FS, but not limited thereto. In some embodiments, the stretchable supporting film SSF and the supporting film SUF may include the same material. In some embodiments, the material of the stretchable supporting film SSF and the material of the supporting film SUF may be different.

In the present embodiment, the supporting film SUF and the adhesive layer ADH of the flexible sensor FD6 may be disposed corresponding to the stretchable substrate FS and the opening region OPR, but not limited thereto. That is, the supporting film SUF and the adhesive layer ADH of the present embodiment may be continuous layers. In some embodiments, the structures of the supporting film SUF and the adhesive layer ADH of the flexible sensor FD6 may refer to the structure shown in FIG. 11 or FIG. 12.

It should be noted that although it is not shown in the figure, the flexible sensor FD6 may further include a polymer material (such as a stretchable polymer material) disposed corresponding to the opening region OPR. Specifically, the polymer material may be filled in the opening region OPR. Therefore, the stretchability of the flexible sensor FD6 may be improved, or the stability of the flexible sensor FD6 may be improved.

In the present embodiment, the optical element layer OEL may be a continuous layer, but not limited thereto. Specifically, compared with the optical element layer OEL in the above-mentioned embodiments, the optical element layer OEL of the present embodiment is not patterned to form the plurality of optical elements (not shown in the figure)

separated from each other. In such condition, the elements and the layers (such as the non-IR cur filter CFR, the anti-reflection layer ARF and the insulating layer IN mentioned above) included in the optical elements disposed corresponding to different island portions IP may be connected to each other to form a continuous structure.

The feature that the flexible sensor FD6 includes the stretchable supporting film SSF in the present embodiment may be applied to each of the embodiments and variant embodiments of the present disclosure.

The manufacturing method of the flexible sensor of the present disclosure will be detailed in the following.

Referring to FIG. 14 to FIG. 17, FIG. 14 to FIG. 17 schematically illustrate the manufacturing process of an electronic device according to an eighth embodiment of the present disclosure. The manufacturing method of the electronic device of the present embodiment may be applied to the flexible sensors in the embodiments and variant embodiments mentioned above. According to the present embodiment, the manufacturing method of the electronic device may include the following steps:

S102: providing a stretchable substrate, and disposing a circuit structure on the stretchable substrate;

S104: disposing a sacrificing layer and sensing elements on the stretchable substrate;

S106: disposing a protecting layer on the sensing elements;

S108: disposing a supporting film at a side of the stretchable substrate opposite to the circuit structure;

S110: removing the protecting layer and the sacrificing layer; and

S112: disposing optical elements on the sensing elements.

The steps will be detailed in the following.

Figure 14:
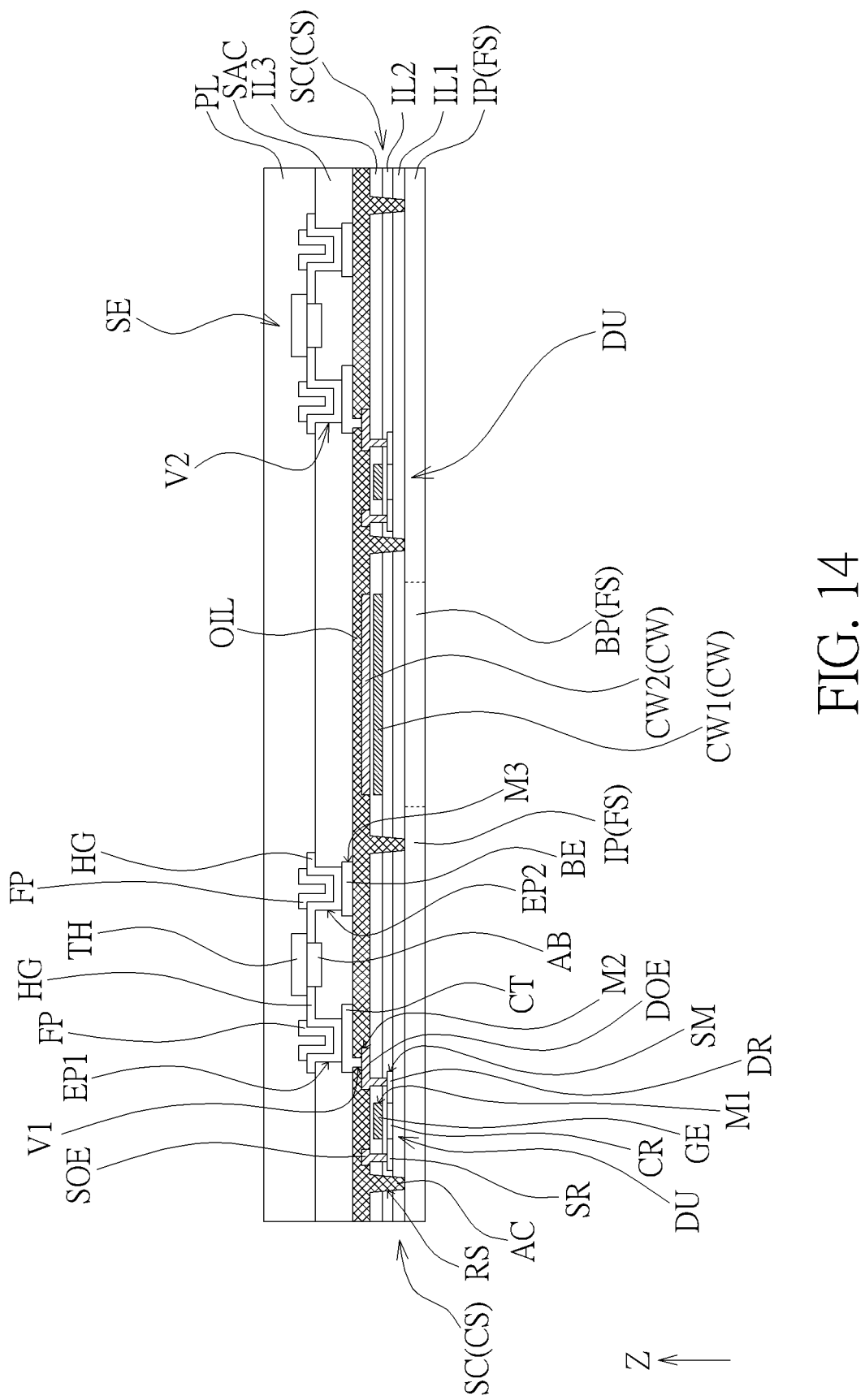
FIG. 14, FIG. 15, FIG. 16, and FIG. 17 schematically illustrate the manufacturing process of an electronic device according to an eighth embodiment of the present disclosure.

As shown in FIG. 14, the manufacturing method of the electronic device of the present embodiment may include the step S102: providing a stretchable substrate FS, and disposing a circuit structure CS on the stretchable substrate FS at first. The structures of the stretchable substrate FS and the circuit structure CS may refer to the contents mentioned above, and will not be redundantly described. In some embodiments, a patterning process may be performed on the stretchable substrate FS before the circuit structure CS is disposed on the stretchable substrate FS, such that the portion of the stretchable substrate FS corresponding to the opening region (that is, the opening region OPR mentioned above) may be removed, thereby forming the island portions IP and the bridge portions BP. In such condition, the stretchable substrate FS may have the structure shown in FIG. 3. In some embodiments, the circuit structure CS may be disposed on the stretchable substrate FS at first, and a patterning process may be performed on the stretchable substrate FS and the circuit structure CS simultaneously. For example, a portion of the stretchable substrate FS and a portion of the circuit structure CS corresponding to the opening region may be removed in the same patterning process. In some embodiments, the stretchable substrate FS may not be patterned, or the portion of the stretchable substrate FS corresponding to the opening region may not be removed, as shown in FIG. 10 above.

When the circuit structure CS is being formed, the connecting wire(s) CW may be formed at the same time. The connecting wire(s) CW may for example be in the same layer as the conductive layers in the circuit structure CS, or the connecting wire (s) CW may be formed of the conductive layers in the circuit structure CS, but not limited thereto. For example, as shown in FIG. 14, the connecting wire CW1 (such as the scan line SL above) may be formed of the conductive layer M1, and the connecting wire CW2 (such as the data line DL above) may be formed of the conductive layer M2. The disposition position of the connecting wire (s) CW may be determined according to the position of the bridge portions BP of the stretchable substrate FS. In some embodiments, as shown in FIG. 14, the portions of the insulating layers (such as the insulating layer IL1, the insulating layer IL2 and the insulating layer IL3) in the circuit structure CS corresponding to the bridge portion BP may not be removed, which may refer to the structure shown in FIG. 11. In some embodiments, the portions of the insulating layers in the circuit structure CS corresponding to the bridge portion BP may be removed, except for the insulating layer IL3 disposed between the connecting wire CW1 and the connecting wire CW2, which may refer to the structure shown in FIG. 2. In addition, although it is not shown in the figure, a portion of the circuit structure CS corresponding to the opening region may be removed through a patterning process, as shown in FIG. 3.

In some embodiments, after the circuit structure CS is formed, a recess RS may further be formed in the circuit structure CS. The structure of the recess RS may refer to the contents mentioned above, and will not be redundantly described. In some embodiments, after the circuit structure CS is formed, an organic insulating layer OIL may be formed on the circuit structure CS, wherein the organic insulating layer OIL may be filled into the recess RS to form an anti-cracking structure AC. The structure of the organic insulating layer OIL may refer to the contents mentioned above, and will not be redundantly described.

After that, the step S104 may be performed to dispose the sacrificing layer SAC and the sensing elements SE on the stretchable substrate FS. In detail, as shown in FIG. 14, after the organic insulating layer OIL is formed, a conductive layer M3 may be disposed on the organic insulating layer OIL, thereby forming the contact CT and the bias electrode BE. After that, the sacrificing layer SAC may be disposed on the organic insulating layer OIL. The sacrificing layer SAC may cover the conductive layer M3. After that, the sensing elements SE may be disposed corresponding to the position of the island portions IP of the stretchable substrate FS. One or more sensing elements SE may be disposed on an island portion IP. The sensing element SE may be electrically connected to the bias electrode BE and the contact CT. Specifically, before the sensing elements SE are disposed, a via V2 may be formed in the sacrificing layer SAC, wherein the via V2 may expose the bias electrode BE and the contact CT, and the sensing element SE (for example, the hinge arm HG of the sensing element SE) may extend into the via V2 and contact the bias electrode BE and the contact CT. The structure of the sensing element SE may refer to the contents mentioned above, and will not be redundantly described.

After that, the step S106 may be performed to dispose the protecting layer PL on the sensing elements SE. Specifically, after the sensing elements SE are formed, the protecting layer PL may be disposed on the sacrificing layer SAC, wherein the protecting layer PL may cover the sensing elements SE. The protecting layer PL may include any suitable insulating material.

Figure 15:
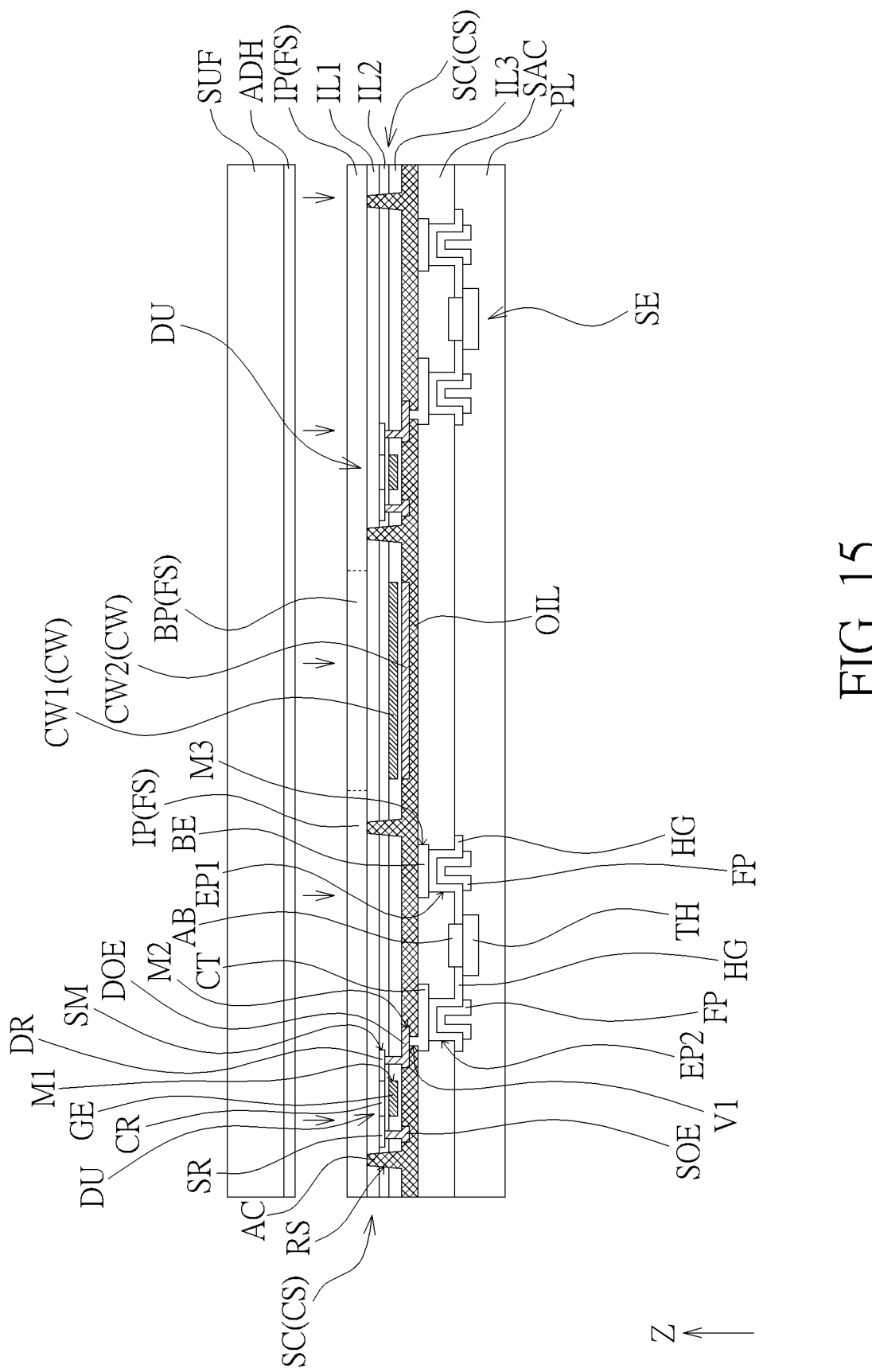
Figure 16:
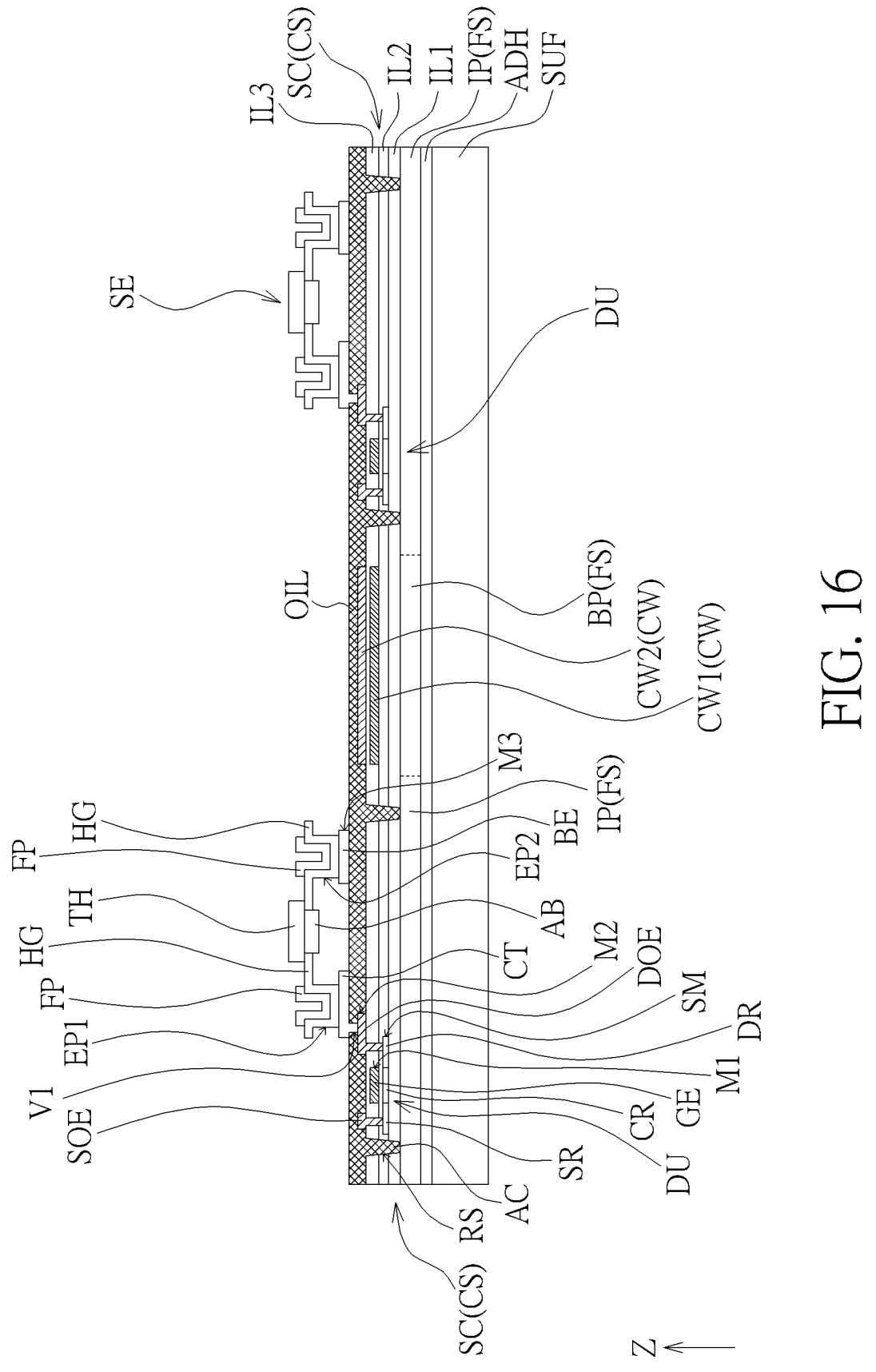

After that, the step S108 may be performed to dispose the supporting film SUF at a side of the stretchable substrate FS opposite to the circuit structure CS. Specifically, as shown in FIG. 15, after the protecting layer PL is formed, the structure shown in FIG. 14 may be flipped, and the supporting film SUF may be attached to the stretchable substrate FS. In the present embodiment, the supporting film SUF may for example be attached to the stretchable substrate FS through the adhesive layer ADH, but not limited thereto. In some embodiments, the adhesive layer ADH is not included between the supporting film SUF and the stretchable substrate FS. The structures of the adhesive layer ADH and the supporting film SUF may refer to the contents above, and will not be redundantly described. In the present embodiment, through the disposition of the protecting layer PL covering the sensing elements SE, the possibility that the sensing elements SE are damaged during the process of attaching the supporting film SUF may be reduced.

After that, the step S110 may be performed to remove the protecting layer PL and the sacrificing layer SAC. Specifically, after the supporting film SUF is attached to the stretchable substrate FS, the structure shown in FIG. 15 may be flipped, and the protecting layer PL may be removed. After the protecting layer PL is removed, the sacrificing layer SAC may then be removed. For example, the sacrificing layer SAC may be removed through etching, but not limited thereto. After the sacrificing layer SAC is removed, the sensing elements SE may be exposed.

Figure 17:
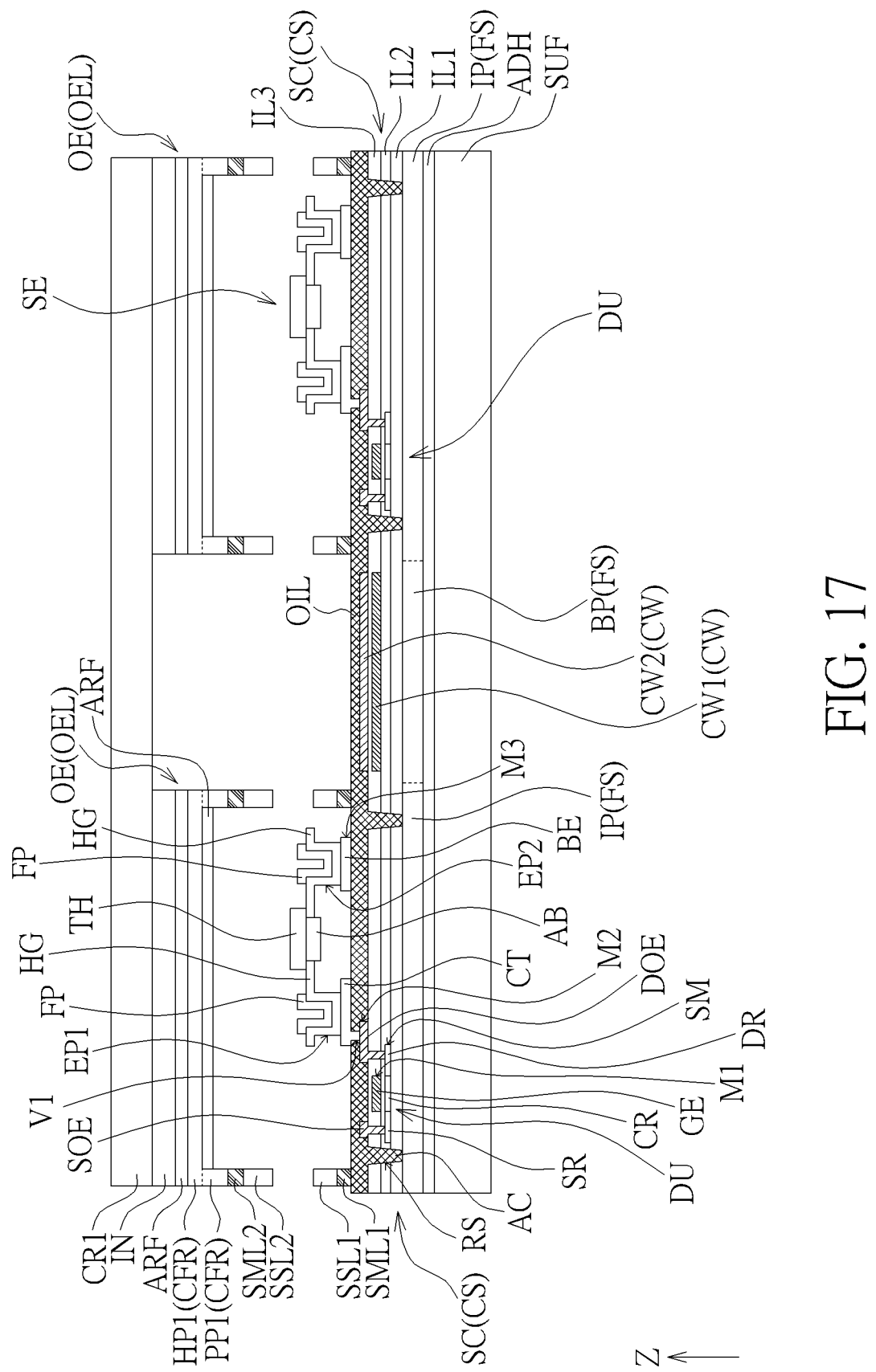

After that, the step S112 may be performed to dispose the optical elements OE on the sensing elements SE. Specifically, the optical elements OE may be formed on a carrier CR1, and then the optical elements OE are transferred onto the sensing elements SE. The carrier CR1 for example includes glass plate, but not limited thereto. In detail, as shown in FIG. 17, the insulating layer IN is formed on the carrier CR1 at first, the anti-reflection layer ARF is formed on the insulating layer IN, the non-IR cut filter CFR is formed on the anti-reflection layer ARF, and another anti-reflection layer ARF is formed on the non-IR cut filter CFR, thereby forming the optical element OE. The non-IR cut filter CFR may be disposed on the anti-reflection layer ARF in the way that the protruding portion PP1 is away from the carrier CR1. It should be noted that although FIG. 17 shows the structure that the optical elements OE are independently disposed on the carrier CR1, the present embodiment is not limited thereto. In some embodiments, the elements and the layers included in different optical elements OE may be connected to each other.

After the optical elements OE are formed on the carrier CR1, the optical elements OE may be disposed on the sensing elements SE through alignment bonding or counter-jointing method. Specifically, the sealing metal layers SML1 and the sealing material layers SSL1 disposed on the sealing metal layers SML1 may be formed on the organic insulating layer OIL, and the sealing metal layers SML2 and the sealing material layers SSL2 may be formed on the protruding portion PP1 of the non-IR cut filter CFR. After that, the sealing material layers SSL1 may be aligned with the sealing material layers SSL2, and the sealing material layers SSL2 may be bonded to the sealing material layers SSL1, such that the optical elements OE are disposed on the sensing elements SE. After that, the carrier CR1 may be removed, thereby forming the electronic device.

Figure 18:
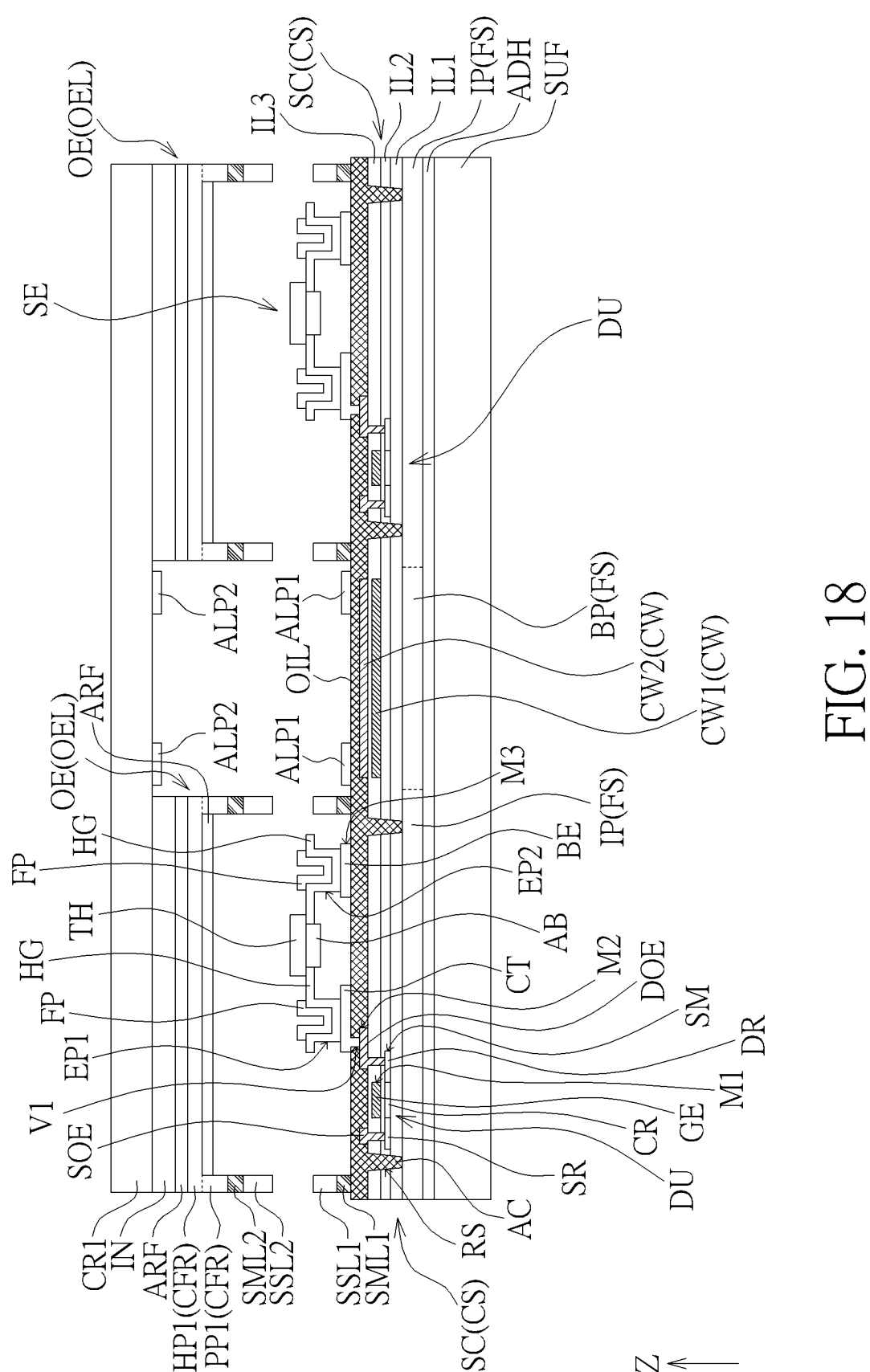
FIG. 18 schematically illustrates a cross-sectional view of an electronic device according to a variant embodiment of the eighth embodiment of the present disclosure.

Referring to FIG. 18, FIG. 18 schematically illustrates a cross-sectional view of an electronic device according to a variant embodiment of the eighth embodiment of the present disclosure. According to the present variant embodiment, the manufacturing method of the electronic device may further include disposing alignment patterns on the carrier CR1 and the organic insulating layer OIL. Specifically, before the step of disposing the optical elements OE on the sensing elements SE through alignment bonding, the alignment pattern ALP1 may be disposed on the organic insulating layer OIL, and the alignment pattern ALP2 may be disposed on the carrier CR1. The alignment pattern ALP1 and the alignment pattern ALP2 may help the optical element OE disposed at a predetermined disposition position. In detail, the disposition positions of the alignment pattern ALP1 and the alignment pattern ALP2 may be determined according to the predetermined disposition position of the optical element OE at first, and in the step of disposing the optical element OE, the optical element OE may be disposed on the sensing element SE in the way that the alignment pattern ALP2 on the carrier CR1 is aligned with the alignment pattern ALP1 on the organic insulating layer OIL. Therefore, the bonding error of the optical elements OE may be reduced. The alignment pattern ALP1 and the alignment pattern ALP2 may include any suitable insulating material. It should be noted that the disposition positions of the alignment pattern ALP1 and the alignment pattern ALP2 are not limited to what is shown in FIG. 18. In some embodiments, the alignment pattern ALP1 and the alignment pattern ALP2 may be disposed corresponding to the island portions IP, in other words, the alignment pattern ALP1 and the alignment pattern ALP2 may be disposed corresponding to the regions where the sensing elements SE are disposed.

Figure 19:
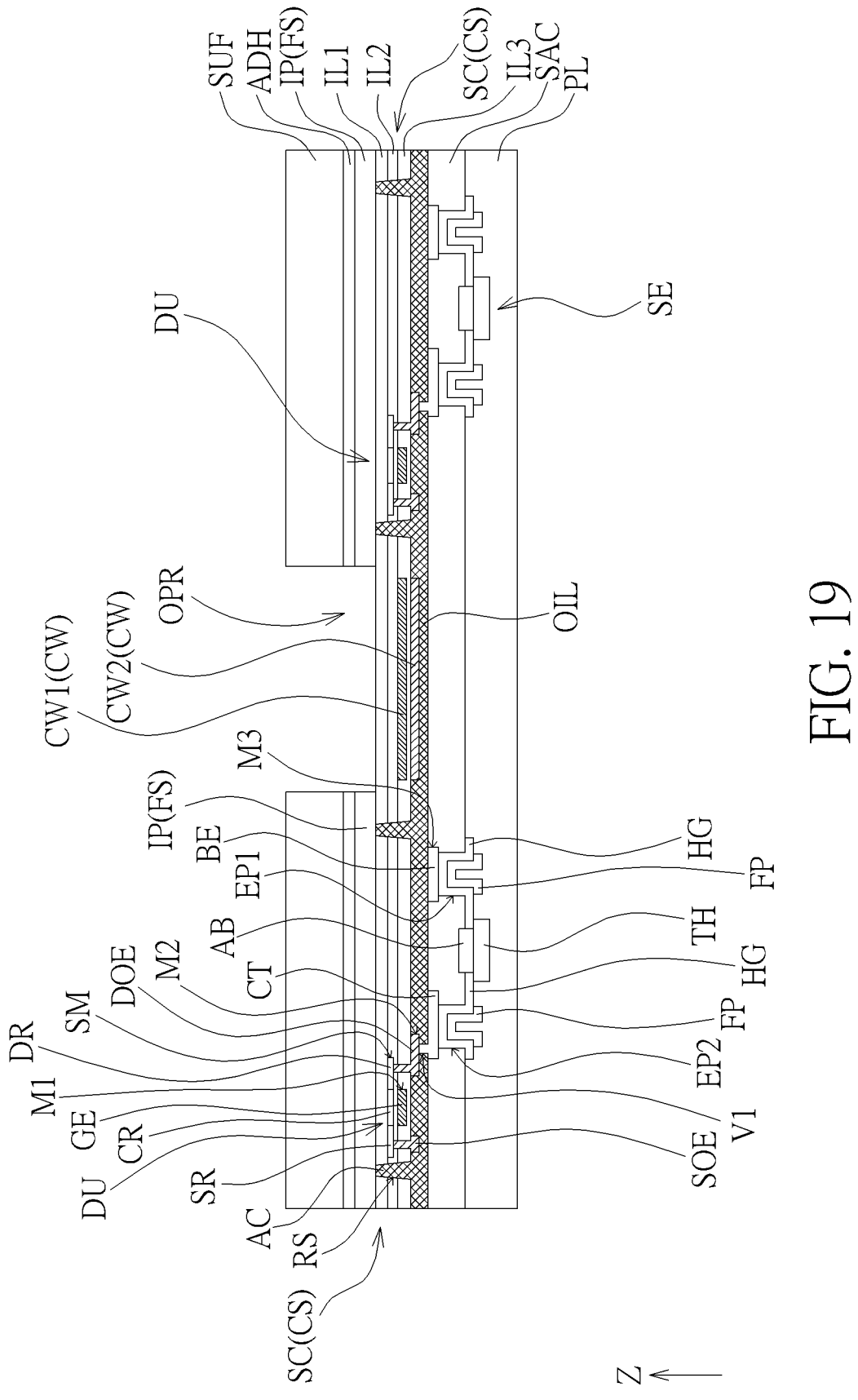
FIG. 19, FIG. 20 and FIG. 21 schematically illustrate the manufacturing process of an electronic device according to a ninth embodiment of the present disclosure.
Figure 20:
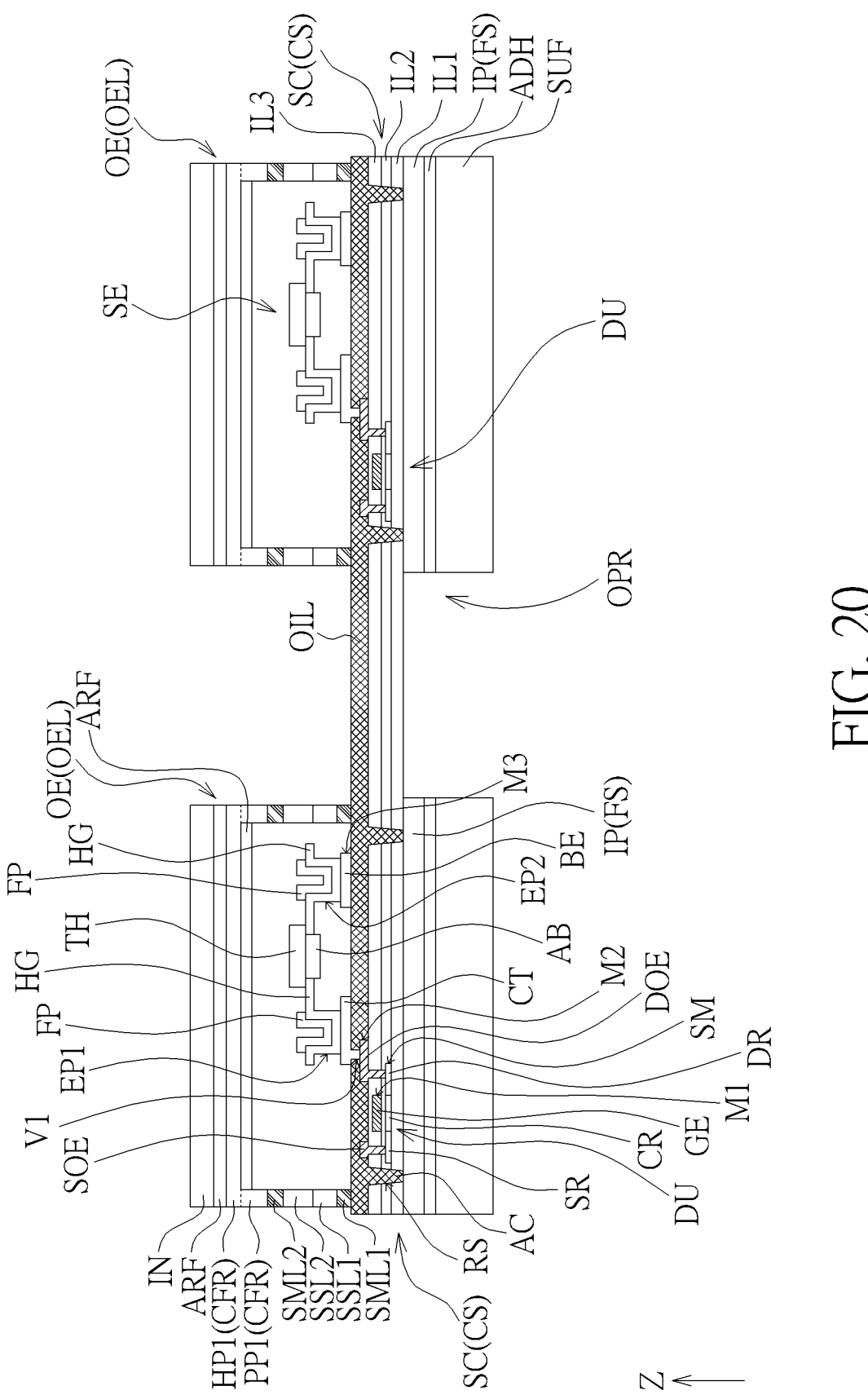
Figure 21:
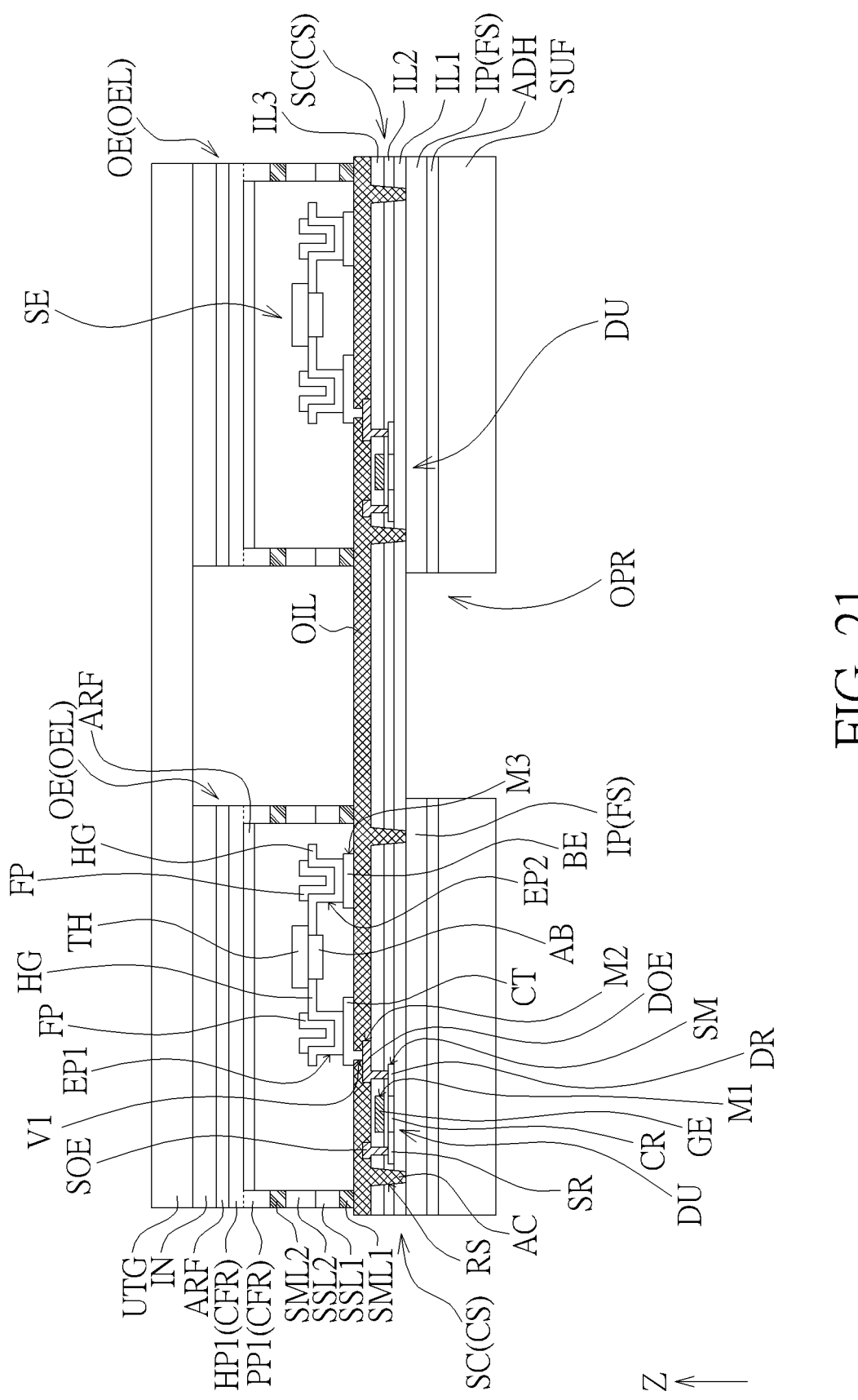

Referring to FIG. 19 to FIG. 21, FIG. 19 to FIG. 21 schematically illustrate the manufacturing process of an electronic device according to a ninth embodiment of the present disclosure. The manufacturing method of the electronic device of the present embodiment may be applied to the flexible sensors in the embodiments and variant embodiments mentioned above. According to the present embodiment, the manufacturing method of the electronic device may include the following steps:

S102: providing a stretchable substrate, and disposing a circuit structure on the stretchable substrate;

S104: disposing a sacrificing layer and sensing elements on the stretchable substrate;

S106: disposing a protecting layer on the sensing elements;

S108: disposing a supporting film at a side of the stretchable substrate opposite to the circuit structure;

S109: patterning the supporting film and the stretchable substrate;

S110: removing the protecting layer and the sacrificing layer;

S112: disposing optical elements on the sensing elements; and

S113: disposing a glass layer on the optical elements.

The steps will be detailed in the following. In the manufacturing method of the electronic device of the present embodiment, the step S102 to the step S108 may refer to the contents mentioned above, and will not be redundantly described.

The manufacturing method of the electronic device of the present embodiment may further include the step S109: patterning the supporting film SUF and the stretchable substrate FS. Specifically, as shown in FIG. 19, after the supporting film SUF is attached to the stretchable substrate FS (for example, through the adhesive layer ADH), a patterning process may be performed on the supporting film SUF and/or the stretchable substrate FS to remove a portion of the supporting film SUF and/or a portion of the stretchable substrate FS corresponding to the opening region OPR. The pattering process of the supporting film SUF and/or the stretchable substrate FS may for example include laser etching, wet etching or other suitable process. The adhesive layer ADH may be patterned in the pattering process of the supporting film SUF and/or the stretchable substrate FS. It should be noted that in some embodiments, the stretchable substrate FS may not be patterned, or the portion of the stretchable substrate FS corresponding to the opening region OPR may not be removed. In addition, although it is not shown in the figure, in the patterning process of the supporting film SUF, the portion of the supporting film SUF corresponding to the bridge portion BP may be removed, as shown in FIG. 2, but not limited thereto.

After the patterning process of the supporting film SUF and/or the stretchable substrate FS is finished, the step S110 and the step S112 may then be performed, and the details thereof may refer to the contents mentioned above, which will not be redundantly described. After the step S112 is finished, the structure shown in FIG. 20 may be formed.

The manufacturing method of the electronic device of the present embodiment may further include the step S113: disposing the glass layer UTG on the optical elements OE. Specifically, as shown in FIG. 21, after the optical elements OE are disposed, the glass layer UTG may be disposed on the optical elements OE, thereby forming the electronic device. The feature of the glass layer UTG may refer to the contents above, and will not be redundantly described. In some embodiments, after the optical elements OE are disposed, the stretchable supporting film SSF may be disposed on the optical elements OE instead of the glass layer UTG, as shown in FIG. 13. In some embodiments, although it is not shown in the figure, after the glass layer UTG or the stretchable supporting film SSF is disposed on the optical elements OE, a patterning process may further be performed on the glass layer UTG or the stretchable supporting film SSF, wherein the patterned glass layer UTG or the patterned stretchable supporting film SSF may be disposed corresponding to the island portions IP.

In summary, a flexible sensor is provided by the present disclosure, wherein the flexible sensor includes a stretchable substrate and sensing elements disposed on the stretchable substrate. The stretchable substrate includes island portions and bridge portions connected between the island portions, and the sensing elements may be disposed corresponding to the island portions. The flexible sensor of the present disclosure may have good flexibility, thereby increasing application of the flexible sensor.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A flexible sensor capable of being stretched from a first state to a second state, comprising:
    a stretchable substrate having a plurality of island portions and a plurality of bridge portions, wherein at least one of the plurality of bridge portions connects adjacent two of the plurality of island portions;
    a plurality of sensing elements disposed on the plurality of island portions of the stretchable substrate;
    a sealing element disposed on one of the plurality of island portions; and
    an optical element layer disposed on the plurality of sensing elements, wherein the optical element layer includes a plurality of optical elements corresponding to the plurality of island portions respectively, and one of the plurality of optical elements is disposed on the one of the plurality of island portions and in contact with the sealing element,
    wherein in a top view of the flexible sensor, the sealing element is disposed along edges of the one of the plurality of island portions and surrounds a portion of the plurality of sensing elements disposed on the one of the plurality of island portions, and the sealing element is not overlapped with the portion of the plurality of sensing elements,
    wherein the sealing element and the one of the plurality of optical elements form a space, and the portion of the plurality of sensing elements is disposed in the space,
    wherein the at least one of the plurality of bridge portions has a first length in the first state and has a second length in the second state, and the first length is different from the second length.

2. The flexible sensor of claim 1, wherein the flexible sensor has at least one opening region, and four of the plurality of island portions are disposed at periphery of the at least one opening region.

3. The flexible sensor of claim 1, wherein each of the plurality of sensing elements is disposed on and corresponding to one of the plurality of island portions.

4. The flexible sensor of claim 1, wherein multiple of the plurality of sensing elements are disposed on one of the plurality of island portions.

5. The flexible sensor of claim 1, further comprising a supporting spacer disposed on one of the plurality of island portions.

6. The flexible sensor of claim 1, further comprising:
    a circuit structure disposed on the stretchable substrate, the circuit structure comprising a plurality of sub circuit structures being disposed on a surface of one of the plurality of island portions respectively; and
    an organic insulating layer disposed on the circuit structure;
    wherein the plurality of sub circuit structures include at least one driving element respectively, and the at least one driving element is electrically connected to one of the plurality of sensing elements.

7. The flexible sensor of claim 6, wherein the circuit structure includes a recess, and in the top view of the flexible sensor, the recess is disposed along edges of one of the plurality of island portions and surrounds a portion of the plurality of sensing elements disposed on the one of the plurality of island portions.

8. The flexible sensor of claim 7, wherein a portion of the organic insulating layer is filled into the recess and form an anti-cracking structure.

9. The flexible sensor of claim 6, wherein the flexible sensor has at least one opening region, in the top view of the flexible sensor, the at least one opening region is surrounded by multiple of the plurality of island portions and the plurality of bridge portions, wherein the organic insulating layer directly contacts the stretchable substrate in the at least one opening region.

10. The flexible sensor of claim 1, further comprising a glass layer disposed on the optical element layer.

11. The flexible sensor of claim 1, further comprising a stretchable supporting film disposed on the optical element layer.

12. The flexible sensor of claim 1, further comprising a supporting film disposed under the stretchable substrate and corresponding to the plurality of island portions of the stretchable substrate.

13. The flexible sensor of claim 12, wherein the flexible sensor has at least one opening region, and in the top view of the flexible sensor, the at least one opening region is surrounded by multiple of the plurality of island portions and the plurality of bridge portions, wherein the supporting film is further disposed corresponding to the at least one opening region.

14. The flexible sensor of claim 13, wherein a thickness of a portion of the supporting film corresponding to the at least one opening region is less than a thickness of another portion of the supporting film corresponding to the plurality of island portions.

15. The flexible sensor of claim 1, further comprising a heat insulating layer disposed on the plurality of island portions correspondingly and covering the plurality of sensing elements.

16. The flexible sensor of claim 1, wherein the flexible sensor has at least one opening region, and in the top view of the flexible sensor, the at least one opening region is surrounded by multiple of the plurality of island portions and the plurality of bridge portions, wherein the stretchable substrate includes at least one opening, and the at least one opening corresponds to the at least one opening region.

17. The flexible sensor of claim 1, further comprising a connecting wire disposed on the at least one of the plurality of bridge portions and electrically connecting adjacent two of the plurality of sensing elements.

18. The flexible sensor of claim 17, further comprising an anti-cracking structure disposed on one of the plurality of island portions, wherein in the top view of the flexible sensor, the anti-cracking structure is not overlapped with the connecting wire.

\* \* \* \* \*